(12) United States Patent
Hare et al.

(10) Patent No.: US 11,694,402 B2
(45) Date of Patent: Jul. 4, 2023

(54) TEXTURED MESH BUILDING

(71) Applicant: Snap Inc., Santa Monica, CA (US)

(72) Inventors: Samuel Edward Hare, Los Angeles, CA (US); Andrew James McPhee, Culver City, CA (US); Daniel Moreno, Los Angeles, CA (US); Kyle Goodrich, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/506,478

(22) Filed: Oct. 20, 2021

(65) Prior Publication Data

US 2022/0044479 A1 Feb. 10, 2022

Related U.S. Application Data

(63) Continuation of application No. 16/460,519, filed on Jul. 2, 2019, now Pat. No. 11,176,737.

(Continued)

(51) Int. Cl.
*G06T 17/20* (2006.01)
*G06T 15/04* (2011.01)
(Continued)

(52) U.S. Cl.
CPC .............. *G06T 17/20* (2013.01); *G06T 3/20* (2013.01); *G06T 3/40* (2013.01); *G06T 7/20* (2013.01); *G06T 7/251* (2017.01); *G06T 11/60* (2013.01); *G06T 13/20* (2013.01); *G06T 15/00* (2013.01); *G06T 15/04* (2013.01); *G06T 19/006* (2013.01); *G06T 19/20* (2013.01); *G06F 2218/00* (2023.01); *G06T 2219/2004* (2013.01);
(Continued)

(58) Field of Classification Search
CPC .......... G06T 17/20; G06T 7/251; G06T 3/20; G06T 3/40; G06T 7/20; G06T 11/60; G06T 13/20; G06T 15/00; G06T 15/04; G06T 19/006; G06T 19/20; G06T 2219/2004; G06T 2219/2012; G06T 2219/2016; G06K 9/00496
See application file for complete search history.

(56) References Cited

U.S. PATENT DOCUMENTS

| | | | |
|---|---|---|---|
| 5,751,850 | A | 5/1998 | Rindtorff |
| 5,880,731 | A | 3/1999 | Liles et al. |

(Continued)

FOREIGN PATENT DOCUMENTS

| | | |
|---|---|---|
| CA | 2887596 A1 | 7/2015 |
| CN | 109863510 A | 6/2019 |

(Continued)

OTHER PUBLICATIONS

US 10,964,114 B2, 03/2021, Hare et al. (withdrawn)
(Continued)

*Primary Examiner* — Xin Sheng
(74) *Attorney, Agent, or Firm* — Schwegman, Lundberg & Woessner, P.A.

(57) ABSTRACT

Systems and methods are provided for receiving a two-dimensional (2D) image comprising a 2D object; identifying a contour of the 2D object; generating a three-dimensional (3D) mesh based on the contour of the 2D object; and applying a texture of the 2D object to the 3D mesh to output a 3D object representing the 2D object.

19 Claims, 15 Drawing Sheets

Related U.S. Application Data

Figure 1:
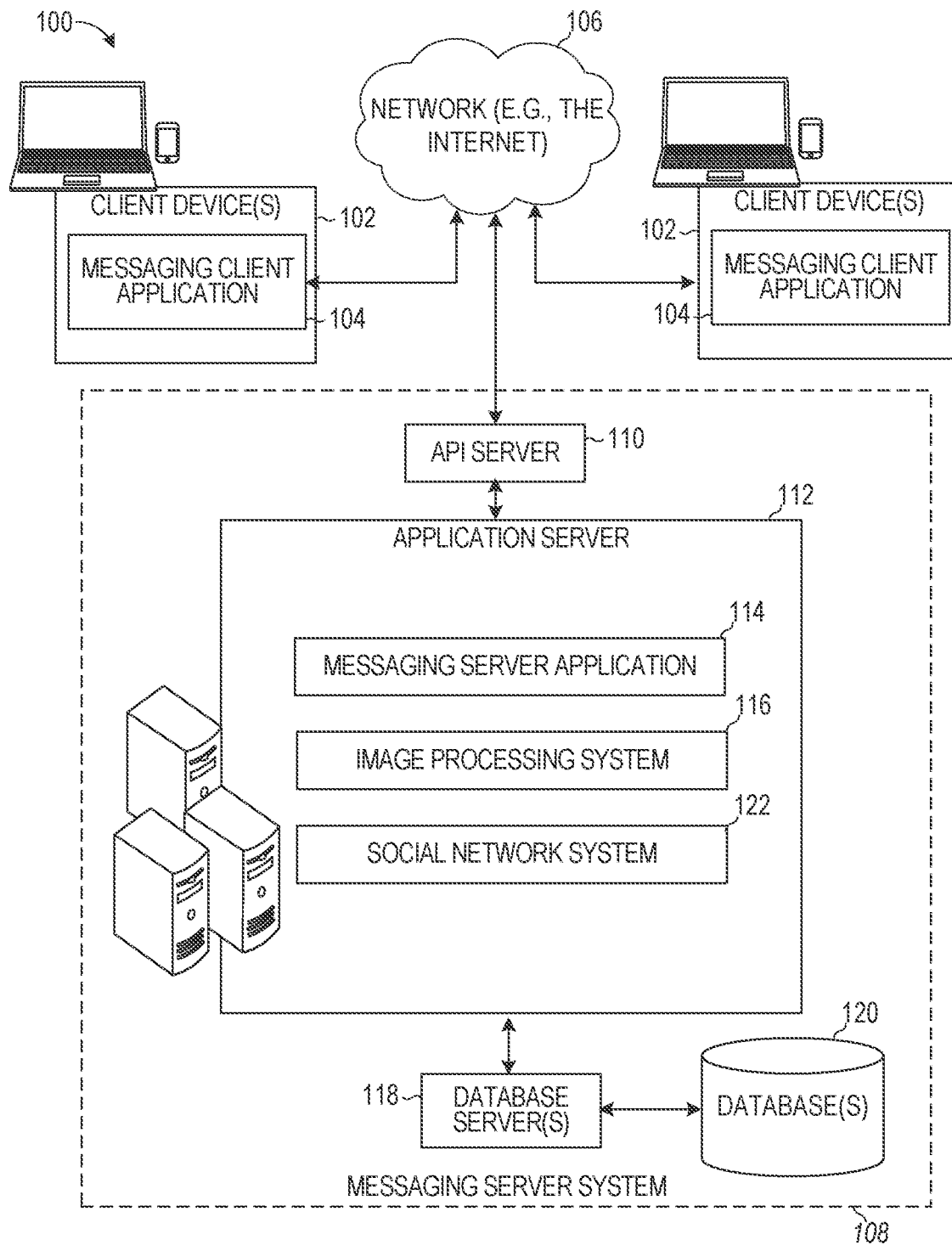

(60) Provisional application No. 62/775,713, filed on Dec. 5, 2018, provisional application No. 62/771,964, filed on Nov. 27, 2018.

(51) Int. Cl.

| | |
|---|---|
| *G06T 19/20* | (2011.01) |
| *G06T 7/246* | (2017.01) |
| *G06T 3/20* | (2006.01) |
| *G06T 3/40* | (2006.01) |
| *G06T 7/20* | (2017.01) |
| *G06T 11/60* | (2006.01) |
| *G06T 13/20* | (2011.01) |
| *G06T 15/00* | (2011.01) |
| *G06T 19/00* | (2011.01) |

(52) U.S. Cl.
CPC ........... *G06T 2219/2012* (2013.01); *G06T 2219/2016* (2013.01)

(56) References Cited

U.S. PATENT DOCUMENTS

| | | | |
|---|---|---|---|
| 6,020,891 | A | 2/2000 | Rekimoto |
| 6,023,270 | A | 2/2000 | Brush, II et al. |
| 6,038,295 | A | 3/2000 | Mattes |
| 6,157,342 | A | 12/2000 | Okude et al. |
| 6,223,165 | B1 | 4/2001 | Lauffer |
| 6,434,277 | B1 * | 8/2002 | Yamada ............ G06T 15/04 382/285 |
| 6,772,195 | B1 | 8/2004 | Hatlelid et al. |
| 6,842,779 | B1 | 1/2005 | Nishizawa |
| 6,867,787 | B1 | 3/2005 | Shimizu et al. |
| 6,980,909 | B2 | 12/2005 | Root et al. |
| 7,173,651 | B1 | 2/2007 | Knowles |
| 7,342,587 | B2 | 3/2008 | Danzig et al. |
| 7,411,493 | B2 | 8/2008 | Smith |
| 7,468,729 | B1 | 12/2008 | Levinson |
| 7,535,890 | B2 | 5/2009 | Rojas |
| 7,636,755 | B2 | 12/2009 | Blattner et al. |
| 7,639,251 | B2 | 12/2009 | Gu et al. |
| 7,775,885 | B2 | 8/2010 | Van Luchene et al. |
| 7,859,551 | B2 | 12/2010 | Bulman et al. |
| 7,885,931 | B2 | 2/2011 | Seo et al. |
| 7,925,703 | B2 | 4/2011 | Dinan et al. |
| 8,088,044 | B2 | 1/2012 | Tchao et al. |
| 8,095,878 | B2 | 1/2012 | Bates et al. |
| 8,108,774 | B2 | 1/2012 | Finn et al. |
| 8,117,281 | B2 | 2/2012 | Robinson et al. |
| 8,130,219 | B2 | 3/2012 | Fleury et al. |
| 8,131,597 | B2 | 3/2012 | Hudetz |
| 8,146,005 | B2 | 3/2012 | Jones et al. |
| 8,151,191 | B2 | 4/2012 | Nicol |
| 8,199,747 | B2 | 6/2012 | Rojas et al. |
| 8,332,475 | B2 | 12/2012 | Rosen et al. |
| 8,384,719 | B2 | 2/2013 | Reville et al. |
| RE44,054 | E | 3/2013 | Kim |
| 8,396,708 | B2 | 3/2013 | Park et al. |
| 8,425,322 | B2 | 4/2013 | Gillo et al. |
| 8,458,601 | B2 | 6/2013 | Castelli et al. |
| 8,462,198 | B2 | 6/2013 | Lin et al. |
| 8,484,158 | B2 | 7/2013 | Deluca et al. |
| 8,495,503 | B2 | 7/2013 | Brown et al. |
| 8,495,505 | B2 | 7/2013 | Smith et al. |
| 8,504,926 | B2 | 8/2013 | Wolf |
| 8,553,032 | B1 * | 10/2013 | Poston ............ G06T 11/40 345/423 |
| 8,559,980 | B2 | 10/2013 | Pujol |
| 8,564,621 | B2 | 10/2013 | Branson et al. |
| 8,564,710 | B2 | 10/2013 | Nonaka et al. |
| 8,570,343 | B2 | 10/2013 | Halstead |
| 8,581,911 | B2 | 11/2013 | Becker et al. |
| 8,597,121 | B2 | 12/2013 | del Valle |
| 8,601,051 | B2 | 12/2013 | Wang |
| 8,601,379 | B2 | 12/2013 | Marks et al. |
| 8,632,408 | B2 | 1/2014 | Gillo et al. |
| 8,648,865 | B2 | 2/2014 | Dawson et al. |
| 8,659,548 | B2 | 2/2014 | Hildreth |
| 8,683,354 | B2 | 3/2014 | Khandelwal et al. |
| 8,692,830 | B2 | 4/2014 | Nelson et al. |
| 8,718,333 | B2 | 5/2014 | Wolf et al. |
| 8,724,622 | B2 | 5/2014 | Rojas |
| 8,730,156 | B2 | 5/2014 | Weising et al. |
| 8,810,513 | B2 | 8/2014 | Ptucha et al. |
| 8,812,171 | B2 | 8/2014 | Filev et al. |
| 8,832,201 | B2 | 9/2014 | Wall |
| 8,832,552 | B2 | 9/2014 | Arrasvuori et al. |
| 8,839,327 | B2 | 9/2014 | Amento et al. |
| 8,874,677 | B2 | 10/2014 | Rosen et al. |
| 8,890,926 | B2 | 11/2014 | Tandon et al. |
| 8,892,999 | B2 | 11/2014 | Nims et al. |
| 8,909,679 | B2 | 12/2014 | Root et al. |
| 8,924,250 | B2 | 12/2014 | Bates et al. |
| 8,963,926 | B2 | 2/2015 | Brown et al. |
| 8,989,786 | B2 | 3/2015 | Feghali |
| 8,995,433 | B2 | 3/2015 | Rojas |
| 9,031,809 | B1 | 5/2015 | Kumar et al. |
| 9,040,574 | B2 | 5/2015 | Wang et al. |
| 9,055,416 | B2 | 6/2015 | Rosen et al. |
| 9,086,776 | B2 | 7/2015 | Ye et al. |
| 9,100,806 | B2 | 8/2015 | Rosen et al. |
| 9,100,807 | B2 | 8/2015 | Rosen et al. |
| 9,105,014 | B2 | 8/2015 | Collet et al. |
| 9,191,776 | B2 | 11/2015 | Root et al. |
| 9,204,252 | B2 | 12/2015 | Root |
| 9,241,184 | B2 | 1/2016 | Weerasinghe |
| 9,256,860 | B2 | 2/2016 | Herger et al. |
| 9,298,257 | B2 | 3/2016 | Hwang et al. |
| 9,314,692 | B2 | 4/2016 | Konoplev et al. |
| 9,330,483 | B2 | 5/2016 | Du et al. |
| 9,357,174 | B2 | 5/2016 | Li et al. |
| 9,361,510 | B2 | 6/2016 | Yao et al. |
| 9,378,576 | B2 | 6/2016 | Bouaziz et al. |
| 9,402,057 | B2 | 7/2016 | Kaytaz et al. |
| 9,412,192 | B2 | 8/2016 | Mandel et al. |
| 9,430,791 | B1 | 8/2016 | Sutton-shearer |
| 9,442,564 | B1 | 9/2016 | Dillon |
| 9,443,227 | B2 | 9/2016 | Evans et al. |
| 9,460,541 | B2 | 10/2016 | Li et al. |
| 9,489,661 | B2 | 11/2016 | Evans et al. |
| 9,489,760 | B2 | 11/2016 | Li et al. |
| 9,491,134 | B2 | 11/2016 | Rosen et al. |
| 9,503,845 | B2 | 11/2016 | Vincent |
| 9,508,197 | B2 | 11/2016 | Quinn et al. |
| 9,517,403 | B1 | 12/2016 | Kim et al. |
| 9,544,257 | B2 | 1/2017 | Ogundokun et al. |
| 9,576,201 | B2 | 2/2017 | Wu et al. |
| 9,576,400 | B2 | 2/2017 | Van Os et al. |
| 9,589,357 | B2 | 3/2017 | Li et al. |
| 9,592,449 | B2 | 3/2017 | Barbalet et al. |
| 9,633,447 | B2 | 4/2017 | Swaminathan et al. |
| 9,645,394 | B2 | 5/2017 | Kinnebrew et al. |
| 9,648,376 | B2 | 5/2017 | Chang et al. |
| 9,652,897 | B2 | 5/2017 | Osborn et al. |
| 9,697,635 | B2 | 7/2017 | Quinn et al. |
| 9,706,040 | B2 | 7/2017 | Kadirvel et al. |
| 9,744,466 | B2 | 8/2017 | Fujioka |
| 9,746,990 | B2 | 8/2017 | Anderson et al. |
| 9,749,270 | B2 | 8/2017 | Collet et al. |
| 9,789,403 | B1 | 10/2017 | Furment et al. |
| 9,792,714 | B2 | 10/2017 | Li et al. |
| 9,839,844 | B2 | 12/2017 | Dunstan et al. |
| 9,883,838 | B2 | 2/2018 | Kaleal, III et al. |
| 9,898,849 | B2 | 2/2018 | Du et al. |
| 9,911,073 | B1 | 3/2018 | Spiegel et al. |
| 9,936,165 | B2 | 4/2018 | Li et al. |
| 9,959,037 | B2 | 5/2018 | Chaudhri et al. |
| 9,980,100 | B1 | 5/2018 | Charlton et al. |
| 9,990,373 | B2 | 6/2018 | Fortkort |
| 10,039,988 | B2 | 8/2018 | Lobb et al. |
| 10,097,492 | B2 | 10/2018 | Tsuda et al. |
| 10,116,598 | B2 | 10/2018 | Tucker et al. |
| 10,155,168 | B2 | 12/2018 | Blackstock et al. |

(56) References Cited

U.S. PATENT DOCUMENTS

| | | |
|---|---|---|
| 10,173,141 B1 | 1/2019 | Schindler et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,362,219 B2 | 7/2019 | Wilson et al. |
| 10,387,730 B1 | 8/2019 | Cowburn et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,593,116 B2 | 3/2020 | Egri et al. |
| 10,657,701 B2 | 5/2020 | Osman et al. |
| 10,740,978 B2 | 8/2020 | McPhee et al. |
| 11,030,813 B2 | 6/2021 | Hare et al. |
| 11,176,737 B2 | 11/2021 | Hare et al. |
| 11,210,850 B2 | 12/2021 | Goodrich et al. |
| 2002/0067362 A1 | 6/2002 | Agostino Nocera et al. |
| 2002/0169644 A1 | 11/2002 | Greene |
| 2004/0113915 A1* | 6/2004 | Ohtsuki .................. G06F 9/451 345/582 |
| 2004/0212630 A1 | 10/2004 | Hobgood et al. |
| 2005/0041842 A1 | 2/2005 | Frakes et al. |
| 2005/0162419 A1 | 7/2005 | Kim et al. |
| 2005/0020661 A1 | 9/2005 | Cordelli |
| 2006/0294465 A1 | 12/2006 | Ronen et al. |
| 2007/0018811 A1 | 1/2007 | Gollu |
| 2007/0096678 A1 | 5/2007 | Melrose |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0078758 A1 | 4/2008 | Shimura et al. |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0160779 A1 | 6/2009 | Crockett et al. |
| 2009/0177976 A1 | 7/2009 | Bokor et al. |
| 2009/0202114 A1 | 8/2009 | Morin et al. |
| 2009/0215536 A1 | 8/2009 | Yee et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0020083 A1* | 1/2010 | Kumakura .............. A63F 13/52 345/441 |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2010/0251101 A1 | 9/2010 | Haussecker et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0161242 A1 | 6/2011 | Chung et al. |
| 2011/0183732 A1 | 7/2011 | Block et al. |
| 2011/0202598 A1 | 8/2011 | Evans et al. |
| 2011/0239136 A1 | 9/2011 | Goldman et al. |
| 2012/0002014 A1 | 1/2012 | Walsh |
| 2012/0092329 A1 | 4/2012 | Koo et al. |
| 2012/0113106 A1 | 5/2012 | Choi et al. |
| 2012/0120186 A1 | 5/2012 | Diaz et al. |
| 2012/0124458 A1 | 5/2012 | Cruzada |
| 2012/0130717 A1 | 5/2012 | Xu et al. |
| 2012/0194549 A1 | 8/2012 | Osterhout et al. |
| 2012/0206558 A1 | 8/2012 | Setton |
| 2012/0209924 A1 | 8/2012 | Evans et al. |
| 2012/0224773 A1 | 9/2012 | Sweet, III et al. |
| 2013/0021373 A1 | 1/2013 | Vaught et al. |
| 2013/0050258 A1 | 2/2013 | Liu et al. |
| 2013/0103760 A1 | 4/2013 | Golding et al. |
| 2013/0127980 A1 | 5/2013 | Haddick et al. |
| 2013/0141434 A1 | 6/2013 | Sugden et al. |
| 2013/0201187 A1 | 8/2013 | Tong et al. |
| 2013/0223673 A1 | 8/2013 | Davis et al. |
| 2013/0249948 A1 | 9/2013 | Reitan |
| 2013/0257877 A1 | 10/2013 | Davis |
| 2013/0278631 A1 | 10/2013 | Border et al. |
| 2014/0028713 A1 | 1/2014 | Keating et al. |
| 2014/0043329 A1 | 2/2014 | Wang et al. |
| 2014/0055554 A1 | 2/2014 | Du et al. |
| 2014/0078176 A1 | 3/2014 | Kim et al. |
| 2014/0080560 A1 | 3/2014 | Knutsson |
| 2014/0125678 A1 | 5/2014 | Wang et al. |
| 2014/0129343 A1 | 5/2014 | Finster et al. |
| 2014/0176608 A1 | 6/2014 | Boysen et al. |
| 2014/0026741 A1 | 9/2014 | Fein et al. |
| 2014/0270703 A1 | 9/2014 | Wang et al. |
| 2014/0321702 A1 | 10/2014 | Schmalstieg |
| 2014/0344762 A1 | 11/2014 | Grasset et al. |
| 2014/0351758 A1 | 11/2014 | Yoshida |
| 2015/0023602 A1 | 1/2015 | Wnuk et al. |
| 2015/0098614 A1 | 4/2015 | Gee et al. |
| 2015/0103183 A1 | 4/2015 | Abbott et al. |
| 2015/0206349 A1 | 7/2015 | Rosenthal et al. |
| 2015/0254467 A1 | 9/2015 | Leuthardt et al. |
| 2015/0262029 A1 | 9/2015 | Pirchheim et al. |
| 2015/0264304 A1 | 9/2015 | Chastney et al. |
| 2015/0269783 A1 | 9/2015 | Yun |
| 2015/0301599 A1 | 10/2015 | Miller |
| 2015/0366527 A1 | 12/2015 | Yu et al. |
| 2016/0025978 A1 | 1/2016 | Mallinson |
| 2016/0054837 A1 | 2/2016 | Stafford |
| 2016/0063600 A1 | 3/2016 | Wuang |
| 2016/0073962 A1 | 3/2016 | Yu et al. |
| 2016/0085773 A1 | 3/2016 | Chang et al. |
| 2016/0109940 A1 | 4/2016 | Lyren et al. |
| 2016/0134840 A1 | 5/2016 | Mcculloch |
| 2016/0171739 A1 | 6/2016 | Anderson et al. |
| 2016/0234149 A1 | 8/2016 | Tsuda et al. |
| 2016/0330522 A1 | 11/2016 | Newell et al. |
| 2016/0350967 A1* | 12/2016 | Klassen .................. G06T 15/60 |
| 2016/0360115 A1 | 12/2016 | Rim |
| 2016/0379418 A1 | 12/2016 | Osborn et al. |
| 2017/0038829 A1 | 2/2017 | Lanier et al. |
| 2017/0039986 A1 | 2/2017 | Lanier et al. |
| 2017/0052946 A1 | 2/2017 | Gu et al. |
| 2017/0069134 A1 | 3/2017 | Shapira et al. |
| 2017/0080346 A1 | 3/2017 | Abbas |
| 2017/0087473 A1 | 3/2017 | Siegel et al. |
| 2017/0090747 A1 | 3/2017 | Dash |
| 2017/0103452 A1 | 4/2017 | Hertel et al. |
| 2017/0113140 A1 | 4/2017 | Blackstock et al. |
| 2017/0118145 A1 | 4/2017 | Aittoniemi et al. |
| 2017/0132821 A1 | 5/2017 | Valliani et al. |
| 2017/0178272 A1 | 6/2017 | Lashkari et al. |
| 2017/0199855 A1 | 7/2017 | Fishbeck |
| 2017/0221272 A1 | 8/2017 | Li et al. |
| 2017/0229153 A1 | 8/2017 | Moore et al. |
| 2017/0235848 A1 | 8/2017 | Van Dusen et al. |
| 2017/0243352 A1 | 8/2017 | Kutliroff et al. |
| 2017/0255450 A1 | 9/2017 | Mullins et al. |
| 2017/0278308 A1 | 9/2017 | Bleiweiss et al. |
| 2017/0287060 A1 | 10/2017 | Choi et al. |
| 2017/0310934 A1 | 10/2017 | Du et al. |
| 2017/0312634 A1 | 11/2017 | Ledoux et al. |
| 2017/0329488 A1 | 11/2017 | Welker et al. |
| 2017/0361225 A1 | 12/2017 | Goslin et al. |
| 2018/0005429 A1 | 1/2018 | Osman et al. |
| 2018/0040166 A1 | 2/2018 | Jayaraj et al. |
| 2018/0047200 A1 | 2/2018 | O'hara et al. |
| 2018/0061072 A1 | 3/2018 | Benezra et al. |
| 2018/0082430 A1 | 3/2018 | Sharma et al. |
| 2018/0083978 A1 | 3/2018 | Pantazelos |
| 2018/0108179 A1 | 4/2018 | Tomlin et al. |
| 2018/0113587 A1 | 4/2018 | Allen et al. |
| 2018/0114365 A1 | 4/2018 | Egri et al. |
| 2018/0115503 A1 | 4/2018 | Baldwin et al. |
| 2018/0122142 A1 | 5/2018 | Egeler et al. |
| 2018/0143748 A1 | 5/2018 | Ahmed et al. |
| 2018/0143950 A1 | 5/2018 | Al-arnaouti et al. |
| 2018/0152400 A1 | 5/2018 | Chung et al. |

(56) References Cited

U.S. PATENT DOCUMENTS

| | | |
|---|---|---|
| 2018/0174600 A1 | 6/2018 | Chaudhuri et al. |
| 2018/0189743 A1 | 7/2018 | Balasubramanian et al. |
| 2018/0197343 A1 | 7/2018 | Hare et al. |
| 2018/0210628 A1 | 7/2018 | Mcphee et al. |
| 2018/0276882 A1 | 9/2018 | Harviainen et al. |
| 2018/0285647 A1 | 10/2018 | Chen et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2018/0330480 A1* | 11/2018 | Liu .................. G06T 19/20 |
| 2018/0336714 A1 | 11/2018 | Stoyles et al. |
| 2018/0349451 A1 | 12/2018 | O'connell et al. |
| 2019/0001223 A1 | 1/2019 | Blackstock et al. |
| 2019/0004688 A1 | 1/2019 | Bowen |
| 2019/0011703 A1 | 1/2019 | Robaina et al. |
| 2019/0057616 A1 | 2/2019 | Cohen et al. |
| 2019/0073834 A1 | 3/2019 | Holzer et al. |
| 2019/0107991 A1 | 4/2019 | Spivack et al. |
| 2019/0188920 A1 | 6/2019 | Mcphee et al. |
| 2019/0221031 A1 | 7/2019 | De La Carcova et al. |
| 2019/0251720 A1 | 8/2019 | Hariton |
| 2019/0304189 A1 | 10/2019 | Falstrup et al. |
| 2019/0311341 A1 | 10/2019 | Rice |
| 2019/0342507 A1 | 11/2019 | Dye et al. |
| 2019/0385378 A1 | 12/2019 | Bastian et al. |
| 2020/0066014 A1 | 2/2020 | Mehta et al. |
| 2020/0074738 A1 | 3/2020 | Hare et al. |
| 2020/0082535 A1 | 3/2020 | Lindskog et al. |
| 2020/0105006 A1 | 4/2020 | Karsch et al. |
| 2020/0167995 A1 | 5/2020 | Hare et al. |
| 2020/0184731 A1 | 6/2020 | Egri et al. |
| 2020/0202632 A1 | 6/2020 | Goodrich et al. |
| 2020/0327734 A1 | 10/2020 | Goodrich et al. |
| 2020/0334916 A1 | 10/2020 | Mcphee et al. |
| 2020/0380259 A1 | 12/2020 | Cahill et al. |
| 2020/0410763 A1 | 12/2020 | Hare et al. |
| 2021/0042993 A1 | 2/2021 | Tagra et al. |
| 2021/0074074 A1 | 3/2021 | Goodrich et al. |
| 2021/0132686 A1 | 5/2021 | Awaji |
| 2021/0174600 A1 | 6/2021 | Hare et al. |
| 2021/0256773 A1 | 8/2021 | Hare et al. |
| 2021/0264668 A1 | 8/2021 | Goodrich et al. |

FOREIGN PATENT DOCUMENTS

| | | |
|---|---|---|
| CN | 109863532 A | 6/2019 |
| CN | 110168476 A | 8/2019 |
| CN | 110168478 A | 8/2019 |
| CN | 112639691 A | 4/2021 |
| CN | 113330484 A | 8/2021 |
| CN | 114080628 | 2/2022 |
| EP | 2184092 A2 | 5/2010 |
| EP | 3086292 A1 | 10/2016 |
| EP | 3506213 A1 | 7/2019 |
| JP | 2001230801 A | 8/2001 |
| JP | 5497931 B2 | 3/2014 |
| KR | 101445263 B1 | 9/2014 |
| KR | 102257167 B1 | 5/2021 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2011109126 A1 | 9/2011 |
| WO | WO-2012139276 A1 | 10/2012 |
| WO | WO-2013017991 A1 | 2/2013 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018081125 A1 | 5/2018 |
| WO | WO-2018102562 A1 | 6/2018 |
| WO | WO-2018128930 | 7/2018 |
| WO | WO-2018129531 | 7/2018 |
| WO | WO-2018129531 A1 | 7/2018 |
| WO | WO-2019089613 A1 | 5/2019 |
| WO | WO-2020047117 A1 | 3/2020 |
| WO | WO-2020132541 A1 | 6/2020 |
| WO | WO-2020264551 A2 | 12/2020 |
| WO | WO-2021003499 A1 | 1/2021 |
| WO | WO-2020264551 A3 | 2/2021 |
| WO | WO-2021046582 A1 | 3/2021 |

OTHER PUBLICATIONS

Wang et al. ("Pixel2mesh: Generating 3d mesh models from single rgb images.", Proceedings of the European Conference on Computer Vision (ECCV), Aug. 2018) (Year: 2018).*

Deepu ("3D Reconstruction from Single 2D image", International Journal of Latest Research in Engineering and Technology, 2016) (Year: 2016).*

Ward ("5 creative ways to use layer stacking in after effects", 2015, https://www.rocketstock.com/blog/5-creative-ways-use-layer-stacking-effects/) (Year: 2015).*

Keeler ("Google Slides: Make a Draggable stack", 2017, https://alicekeeler.com/2017/04/10/google-slides-make-draggable-stack/) (Year: 2017).*

C4dcafe ("Mirror my texture", 2016, https://www.c4dcafe.com/ipb/forums/topic/95957-mirror-my-texture/) (Year: 2016).*

"U.S. Appl. No. 17/319,399, Non Final Office Action dated Apr. 22, 2022", 8 pgs.

"U.S. Appl. No. 17/319,399, Response filed Jul. 21, 2022 to Non Final Office Action dated Apr. 22, 2022", 8 pgs.

"U.S. Appl. No. 15/581,994, Corrected Notice of Allowability dated Jan. 7, 2020", 2 pgs.

"U.S. Appl. No. 15/581,994, Corrected Notice of Allowability dated Feb. 18, 2020", 3 pgs.

"U.S. Appl. No. 15/581,994, Non Final Office Action dated Jun. 6, 2019", 15 pgs.

"U.S. Appl. No. 15/581,994, Notice of Allowance dated Nov. 6, 2019", 8 pgs.

"U.S. Appl. No. 15/581,994, Response filed Feb. 26, 2019 to Final Office Action dated Dec. 3, 2018", 11 pgs.

"U.S. Appl. No. 15/581,994, Response filed Aug. 19, 2019 to Non-Final Office Action dated Jun. 6, 2019", 12 pgs.

"U.S. Appl. No. 16/242,708, Corrected Notice of Allowability dated Feb. 23, 2021", 2 pgs.

"U.S. Appl. No. 16/242,708, Examiner Interview Summary dated Jul. 29, 2020", 3 pgs.

"U.S. Appl. No. 16/242,708, Final Office Action dated Jul. 2, 2020", 25 pgs.

"U.S. Appl. No. 16/242,708, Non Final Office Action dated Feb. 28, 2020", 19 pgs.

"U.S. Appl. No. 16/242,708, Notice of Allowance dated Feb. 4, 2021", 7 pgs.

"U.S. Appl. No. 16/242,708, Notice of Allowance dated Aug. 19, 2020", 5 pgs.

"U.S. Appl. No. 16/242,708, Notice of Allowance dated Nov. 4, 2020", 7 pgs.

"U.S. Appl. No. 16/242,708, Response filed May 15, 2020 to Non Final Office Action dated Feb. 28, 2020", 11 pgs.

"U.S. Appl. No. 16/242,708, Response filed Aug. 5, 2020 to Final Office Action dated Jul. 2, 2020", 11 pgs.

"U.S. Appl. No. 16/283,482, Examiner Interview Summary dated Feb. 19, 2020", 3 pgs.

"U.S. Appl. No. 16/283,482, Final Office Action dated Dec. 16, 2019", 15 pgs.

"U.S. Appl. No. 16/283,482, Notice of Allowance dated Apr. 2, 2020", 9 pgs.

"U.S. Appl. No. 16/283,482, Response filed Mar. 9, 2020 to Final Office Action dated Dec. 16, 2019", 11 pgs.

"U.S. Appl. No. 16/457,461, Corrected Notice of Allowability dated Feb. 26, 2021", 2 pgs.

"U.S. Appl. No. 16/457,461, Examiner Interview Summary dated Jul. 10, 2020", 3 pgs.

(56) References Cited

OTHER PUBLICATIONS

"U.S. Appl. No. 16/457,461, Final Office Action dated Jul. 14, 2020", 16 pgs.
"U.S. Appl. No. 16/457,461, Non Final Office Action dated Apr. 16, 2020", 13 pgs.
"U.S. Appl. No. 16/457,461, Notice of Allowance dated Apr. 14, 2021", 7 pgs.
"U.S. Appl. No. 16/457,461, Notice of Allowance dated Jul. 28, 2021", 5 pgs.
"U.S. Appl. No. 16/457,461, Notice of Allowance dated Sep. 2, 2020", 7 pgs.
"U.S. Appl. No. 16/457,461, Notice of Allowance dated Nov. 19, 2020", 8 pgs.
"U.S. Appl. No. 16/457,461, Response filed Jul. 1, 2020 to Non Final Office Action dated Apr. 16, 2020", 9 pgs.
"U.S. Appl. No. 16/457,461, Response filed Aug. 20, 2020 to Final Office Action dated Jul. 14, 2020", 8 pgs.
"U.S. Appl. No. 16/696,600, 312 Amendment filed Jul. 7, 2021", 7 pgs.
"U.S. Appl. No. 16/696,600, Corrected Notice of Allowability dated Jul. 21, 2021", 3 pgs.
"U.S. Appl. No. 16/696,600, Corrected Notice of Allowability dated Sep. 8, 2021", 2 pgs.
"U.S. Appl. No. 16/696,600, Notice of Allowability dated Jan. 26, 2021", 2 pgs.
"U.S. Appl. No. 16/696,600, Notice of Allowance dated Aug. 17, 2021", 8 pgs.
"U.S. Appl. No. 16/696,600, Notice of Allowance dated Dec. 18, 2020", 11 pgs.
"U.S. Appl. No. 16/721,418, Final Office Action dated Aug. 4, 2021", 31 pgs.
"U.S. Appl. No. 16/721,418, Non Final Office Action dated Apr. 29, 2021", 28 pgs.
"U.S. Appl. No. 16/721,418, Response filed Jul. 28, 2021 to Non Final Office Action dated Apr. 29, 2021", 11 pgs.
"U.S. Appl. No. 16/721,418, Response filed Oct. 4, 2021 to Final Office Action dated Aug. 4, 2021", 12 pgs.
"U.S. Appl. No. 16/721,459, Non Final Office Action dated Apr. 15, 2021", 17 pgs.
"U.S. Appl. No. 16/721,459, Notice of Allowance dated Aug. 19, 2021", 10 pgs.
"U.S. Appl. No. 16/721,459, Response filed Jul. 6, 2021 to Non Final Office Action dated Apr. 15, 2021", 10 pgs.
"U.S. Appl. No. 16/723,540, Examiner Interview Summary dated Jun. 16, 2021", 2 pgs.
"U.S. Appl. No. 16/723,540, Final Office Action dated Sep. 27, 2021", 18 pgs.
"U.S. Appl. No. 16/723,540, Non Final Office Action dated Mar. 18, 2021", 15 pgs.
"U.S. Appl. No. 16/723,540, Response filed Jun. 16, 2021 to Non Final Office Action dated Mar. 18, 2021", 10 pgs.
"U.S. Appl. No. 16/747,318, Examiner Interview Summary dated Mar. 12, 2021", 2 pgs.
"U.S. Appl. No. 16/747,318, Final Office Action dated May 12, 2021", 14 pgs.
"U.S. Appl. No. 16/747,318, Non Final Office Action dated Dec. 15, 2020", 11 pgs.
"U.S. Appl. No. 16/747,318, Notice of Allowance dated Sep. 9, 2021", 6 pgs.
"U.S. Appl. No. 16/747,318, Response filed Mar. 15, 2021 to Non Final Office Action dated Dec. 15, 2020", 11 pgs.
"U.S. Appl. No. 16/747,318, Response filed Aug. 12, 2021 to Final Office Action dated May 12, 2021", 11 pgs.
"U.S. Appl. No. 16/790,322, Non Final Office Action dated Nov. 25, 2020", 21 pgs.
"U.S. Appl. No. 16/790,322, Response filed Feb. 25, 2021 to Non Final Office Action dated Nov. 25, 2020", 9 pgs.
"U.S. Appl. No. 16/922,618, Non Final Office Action dated Apr. 27, 2021", 9 pgs.
"U.S. Appl. No. 16/922,618, Notice of Allowance dated Aug. 4, 2021", 9 pgs.
"U.S. Appl. No. 16/922,618, Response filed Jun. 17, 2021 to Non Final Office Action dated Apr. 27, 2021", 7 pgs.
"European Application Serial No. 17835983.2, Response to Communication Pursuant to Rules 161(1) and 162 EPC filed Feb. 19, 2020", 11 pgs.
"European Application Serial No. 18713732.8, Response to Communication Pursuant to Rules 161(1) and 162 EPC filed Feb. 19, 2020", 25 pgs.
"European Application Serial No. 17865596.5, Extended European Search Report dated Sep. 13, 2019", 11 pgs.
"European Application Serial No. 17865596.5, Response filed Apr. 9, 2020 to Extended European Search Report dated Sep. 13, 2019", 21 pgs.
"European Application Serial No. 21153993.7, Extended European Search Report dated May 12, 2021", 9 pgs.
"International Application Serial No. PCT/US2017/058093, International Preliminary Report on Patentability dated May 9, 2019", 6 pgs.
"International Application Serial No. PCT/US2017/068988, International Preliminary Report on Patentability dated Jul. 18, 2018", 8 pgs.
"International Application Serial No. PCT/US2019/048597, International Preliminary Report on Patentability dated Mar. 11, 2021", 10 pgs.
"International Application Serial No. PCT/US2019/048597, International Search Report dated Dec. 2, 2019", 5 pgs.
"International Application Serial No. PCT/US2019/048597, Written Opinion dated Dec. 2, 2019", 8 pgs.
"International Application Serial No. PCT/US2019/068007, International Preliminary Report on Patentability dated Jul. 1, 2021", 17 pgs.
"International Application Serial No. PCT/US2019/068007, International Search Report dated Apr. 30, 2020", 10 pgs.
"International Application Serial No. PCT/US2019/068007, Invitation to Pay Additional Fees dated Mar. 11, 2020", 18 pgs.
"International Application Serial No. PCT/US2019/068007, Written Opinion dated Apr. 30, 2020", 15 pgs.
"International Application Serial No. PCT/US2020/070158, International Search Report dated Dec. 17, 2020", 5 pgs.
"International Application Serial No. PCT/US2020/070158, Invitation to Pay Additional Fees dated Oct. 1, 2020", 12 pgs.
"International Application Serial No. PCT/US2020/070158, Written Opinion dated Dec. 17, 2020", 12 pgs.
"International Application Serial No. PCT/US2020/070230, International Preliminary Report on Patentability dated Jan. 13, 2022", 16 pgs.
"International Application Serial No. PCT/US2020/070503, International Search Report dated Dec. 2, 2020", 5 pgs.
"International Application Serial No. PCT/US2020/070503, Written Opinion dated Dec. 2, 2020", 7 pgs.
"Korean Application Serial No. 10-2019-7023098, Notice of Preliminary Rejection dated Oct. 8, 2020", w/ English translation, 15 pgs.
"Korean Application Serial No. 10-2019-7023098, Response filed Jan. 8, 2021 to Notice of Preliminary Rejection dated Oct. 8, 2020", w/ English Claims, 19 pgs.
"Korean Application Serial No. 10-2021-7015384, Notice of Preliminary Rejection dated Jun. 11, 2021", w/ English translation, 13 pgs.
"Mobile Keyboard", Unity User Manual, Website, historical copy retrieved from web archive: <https://web.archive.org/web/20181204043559/https://docs.unity3d.com/Manual/MobileKeyboard.html> on Apr. 20, 2021, (Dec. 4, 2018), 5 pgs.
Fuccella, Vittorio, et al., "Gestures and Widgets: Performance in Text Editing on Multi-Touch Capable Mobile Devices", ACM, CHI '13: Proceedings of the SIGCHI Conference on Human Factors in Computing Systems, (Apr. 2013), 2785-2794.
Giaccone, P R, et al., "Foreground-background segmentation by cellular neural networks", IEEE 15th International Conference on Pattern Recognition (ICPR-2000), vol. 2, (2000), 438-441.

(56) References Cited

OTHER PUBLICATIONS

Kawai, Norihiko, et al., "Diminished Reality Based on Image Inpainting Considering Background Geometry", IEEE transactions on visualization and computer graphics, 22(3), (Mar. 1, 2016), 1236-1247.
Marto, Anabela G R, et al., "DinofelisAR Demo: Augmented Reality Based on Natural Features", 12th Iberian Conference on Information Systems and Technologies (CISTI), Lisbon, Portugal, (Jun. 2017), 6 pgs.
Nakajima, Yoshikatsu, et al., "Semantic Object Selection and Detection for Diminished Reality Based on SLAM with Viewpoint Class", IEEE International Symposium on Mixed and Augmented Reality Adjunct Proceedings, (2017), 338-343.
Park, Jong-Seung, et al., "Virtual Object Placement in Video for Augmented Reality", Advances in Multimedia Information Processing—PCM 2005: 6th Pacific Rim Conference on Multimedia, Jeju Island, KR, Proceedings (vol. 3767). Springer, Berlin, DE, (2005), 13-24.
Park, Jungsik, et al., "[Poster] Interactive deformation of real objects", 2014 IEEE International Symposium on Mixed and Augmented Reality (ISMAR), (Sep. 10, 2014), 295-296.
Ranganathan, Parthasarathy, et al., "Energy-Aware User Interfaces and Energy-Adaptive Displays", IEEE, Computer, vol. 39, Issue 3, (Mar. 20, 2006), 31-38.
Salas-Morena, Renato F, et al., "Dense Planar Slam", IEEE Intl. Symposium on Mixed and Augmented Reality (ISMAR), Munich, Germany, [Online] Retrieved from the Internet: <URL: http://www.doc.ic.ac.uk/~bglocker/pdfs/salas-moreno2014ismar.pdf>, (Jan. 1, 2014), 8 pgs.
Schettini, R, et al., "A segmentation algorithm for color images", Pattern Recognition Letters, Elsevier, Amsterdam, NL, vol. 14, No. 6, (Jun. 1, 1993), 499-506.
Shohei, Mori, et al., "A survey of diminished reality: Techniques for visually concealing, eliminating, and seeing through real objects", IPSJ Transactions on Computer Vision and Applications, vol. 9, No. 1, (Jun. 28, 2017), 14 pgs.
Yang, Jie, et al., "A Real-Time Face Tracker", Proceedings of the 3rd IEEE Workshop on Applications of Computer Vision (WACV'96), (Dec. 4, 1996), 142-147.
You, Suya, et al., "Hybrid Inertial and Vision Tracking for Augmented Reality Registration", Proceedings IEEE Virtual Reality (Cat. No. 99CB36316), (1999), 8 pgs.
"U.S. Appl. No. 15/581,994, Final Office Action dated Dec. 3, 2018", 18 pgs.
"U.S. Appl. No. 15/581,994, Non Final Office Action dated Jun. 26, 2018", 14 pgs.
"U.S. Appl. No. 15/581,994, Response filed Sep. 26, 2018 to Non Final Office Action dated Jun. 26, 2018", 11 pgs.
"U.S. Appl. No. 15/863,575, Non Final Office Action dated Aug. 9, 2018", 14 pgs.
"U.S. Appl. No. 15/863,575, Notice of Allowance dated Nov. 15, 2018", 8 pgs.
"U.S. Appl. No. 15/863,575, Response filed Sep. 24, 2018 to Non Final Office Action dated Aug. 9, 2018", 9 pgs.
"U.S. Appl. No. 16/283,482, Non Final Office Action dated Jun. 26, 2019", 13 pgs.
"U.S. Appl. No. 16/283,482, Response filed Sep. 26, 2019 to Non Final Office Action dated Jun. 26, 2019", 13 pgs.
"U.S. Appl. No. 16/460,519, Advisory Action dated Mar. 9, 2021", 4 pgs.
"U.S. Appl. No. 16/460,519, Final Office Action dated Jan. 6, 2021", 33 pgs.
"U.S. Appl. No. 16/460,519, Non Final Office Action dated Mar. 17, 2021", 37 pgs.
"U.S. Appl. No. 16/460,519, Non Final Office Action dated Sep. 4, 2020", 27 pgs.
"U.S. Appl. No. 16/460,519, Notice of Allowance dated Jul. 12, 2021", 5 pgs.
"U.S. Appl. No. 16/460,519, Response filed Feb. 23, 2021 to Final Office Action dated Jan. 6, 2021", 10 pgs.
"U.S. Appl. No. 16/460,519, Response filed Jun. 15, 2021 to Non Final Office Action dated Mar. 17, 2021", 10 pgs.
"U.S. Appl. No. 16/460,519, Response filed Dec. 2, 2020 to Non Final Office Action dated Sep. 4, 2020", 10 pgs.
"U.S. Appl. No. 16/696,600, Corrected Notice of Allowability dated May 12, 2021", 2 pgs.
"U.S. Appl. No. 16/696,600, Non Final Office Action dated Sep. 15, 2020", 20 pgs.
"U.S. Appl. No. 16/696,600, Notice of Allowance dated May 4, 2021", 9 pgs.
"U.S. Appl. No. 16/696,600, Response filed Oct. 30, 2020 to Non Final Office Action dated Sep. 15, 2020", 8 pgs.
"International Application Serial No. PCT/US2017/058093, International Search Report dated Jan. 4, 2018", 2 pgs.
"International Application Serial No. PCT/US2017/058093, Written Opinion dated Jan. 4, 2018", 4 pgs.
"International Application Serial No. PCT/US2017/068988, International Search Report dated Apr. 5, 2018", 3 pgs.
"International Application Serial No. PCT/US2017/068988, Written Opinion dated Apr. 5, 2018", 6 pgs.
"International Application Serial No. PCT/US2018/012967, International Preliminary Report on Patentability dated Jul. 18, 2019", 8 pgs.
"International Application Serial No. PCT/US2018/012967, International Search Report dated May 15, 2018", 5 pgs.
"International Application Serial No. PCT/US2018/012967, Written Opinion dated May 15, 2018", 6 pgs.
"International Application Serial No. PCT/US2020/070230, International Search Report dated Nov. 5, 2020", 7 pgs.
"International Application Serial No. PCT/US2020/070230, Invitation to Pay Additional Fees dated Sep. 15, 2020", 16 pgs.
"International Application Serial No. PCT/US2020/070230, Written Opinion dated Nov. 5, 2020", 14 pgs.
"Mirror my texture", C4dcafe, [Online] Retrieved from the Internet: <URL: https://www.c4dcafe.com/ipb/forums/topic/95957-mirror-my-texture/)>, (2016), 3 pgs.
Deepu, R, et al., "3D Reconstruction from Single 2D Image", International Journal of Latest Research in Engineering and Technology (IJLRET), 2(1), (Jan. 2016), 42-51.
Keeler, Alice, "Google Slides: Make a Draggable Stack", Teacher Tech with Alice Keeler, [Online] Retrieved from the Internet: <URL: https://alicekeeler.com/2017/04/10/google-slides-make-draggable-stack/>, (2017), 9 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Long, et al., "Context-Aware Mixed Reality: A Framework for Ubiquitous Interaction", arXiv:1803.05541v1, Cornell University Library, Ithaca, NY, (Mar. 14, 2018), 11 pgs.
Pixovert, "Create Ray Traced 3D Text in After Effects CS6", Youtube Video, [Online] Retrieved from the Internet: <URL: https://www.youtube.com/watch?v=qGbVQRTrhXM>, (Mar. 24, 2013), 15 pgs.; 7:09 min.
Robinson, Ian, "Add 3D text to video footage", Adobe.com/Youtube video, [Online] Retrieved from the Internet: <URL: https://helpx.adobe.com/after-effects/how-to/add-3d-text-video-footage.html>, (Mar. 10, 2017), 360 pgs.; 15:22 min.
Wang, Nanyang, et al., "Pixel2mesh: Generating 3d mesh models from single rgb images", Proceedings of the European Conference on Computer Vision (ECCV); arXiv:1804.01654v2 [cs.CV], (2018), 16 pgs.
Ward, Caleb, "5 Creative Ways to Use Layer Stacking in After Effects", RocketStock Blog, [Online] Retrieved from the Internet: <URL: https://www.rocketstock.com/blog/5-creative-ways-use-layer-stacking-effects/>, (2015), 9 pgs.
"U.S. Appl. No. 17/319,399, Notice of Allowance dated Aug. 25, 2022", 9 pgs.

\* cited by examiner

TEXTURED MESH BUILDING

CROSS-REFERENCE TO RELATED APPLICATIONS

This application is a continuation of U.S. patent application Ser. No. 16/460,519, filed on Jul. 2, 2019, which claims the benefit of priority to U.S. Provisional Patent Application Ser. No. 62/775,713, filed on Dec. 5, 2018, and U.S. Provisional Patent Application Ser. No. 62/771,964, filed on Nov. 27, 2018, the entireties of each of which are hereby incorporated by reference herein.

TECHNICAL FIELD

The present disclosure relates generally to visual presentations of virtual content and, more particularly, to rendering a three-dimensional (3D) object within a real-world environment captured in a camera feed of a computing device.

BACKGROUND

Virtual rendering systems can be used to create engaging and entertaining augmented reality experiences, in which 3D virtual object graphics content appear to be present in the real-world. Such systems allow a user to select from a predefined list of 3D objects and display the selected 3D objects in the view of a camera feed.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which:

FIG. 1 is a block diagram showing a messaging system for exchanging data (e.g., messages and associated content) over a network, according to example embodiments.

FIG. 2 is block diagram illustrating further details regarding a messaging system, according to example embodiments.

FIG. 3 is a schematic diagram illustrating data which may be stored in the database of the messaging server system, according to example embodiments.

FIG. 4 is a schematic diagram illustrating a structure of a message generated by a messaging client application for communication, according to example embodiments.

FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral), according to example embodiments.

FIG. 6 is a block diagram illustrating various components of a 3D object generation system, which may be provided as part of the messaging system, according to example embodiments.

FIGS. 7 and 8 are flowcharts illustrating example operations of the 3D object generation system in performing a method for generating a message that includes a 3D object, according to example embodiments.

FIG. 9 is a block diagram illustrating example operations of the 3D object generation system in performing a method for generating a message that includes a 3D object, according to example embodiments.

FIGS. 10 and 11 are illustrative textures for generating a 3D object, according to example embodiments.

FIGS. 12-13 are interface diagrams that illustrate various interfaces provided by the messaging system, according to some example embodiments.

FIG. 14 is a block diagram illustrating a representative software architecture, which may be used in conjunction with various hardware architectures herein described, according to example embodiments.

FIG. 15 is a block diagram illustrating components of a machine able to read instructions from a machine-readable medium (e.g., a machine-readable storage medium) and perform any one or more of the methodologies discussed herein, according to example embodiments.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure improve the functionality of electronic messaging and imaging software and systems by providing functionality that allows users to create virtual 3D objects from a two-dimensional (2D) image, such as a caption, user generated content, pre-generated content, curated content, geofilter, picture, sticker, emoji, and a GIF. The virtual 3D objects that are created are then rendered, as if they exist in real-world environments. For example, media overlays of 3D images can be generated by the system and displayed in conjunction with real-world environment content (e.g., images and/or video) generated by an image-capturing device (e.g., a digital camera).

Users are always seeking new ways to interact with content as if it exists in the real world. Typical systems enable a user to insert a 2D image into a video frame and control its position in two dimensions (e.g., x and y coordinates). However, simply inserting a 2D image into a video frame without considering other objects (e.g., surfaces) in the video frame makes the resulting video frame with the 2D image look un-realistic, particularly because depth of the object cannot be utilized. In addition, because the 2D image that can be inserted lacks any 3D qualities, the typical systems are incapable of considering how to place and position the 2D image relative to real objects that appear in the video frame. Some systems allow a user to choose from a predefined list of 3D objects to insert into a real-word environment that is depicted in a camera feed. While such systems generally work well in presenting such 3D objects in the real-world environment, the lack of ability to customize and manipulate the 3D content by a user makes the systems less appealing and interesting to users.

The embodiments of the present disclosure allow a user to create a virtual 3D object from any 2D image. This enables the user to add the 3D virtual object that has been created into a real-world video frame that contains real-world objects. The user can control the position of the object not only in two dimensions but in three dimensions (e.g., x, y, and z coordinates). Because the 2D image has been converted to a 3D object, the disclosed embodiments are able to track and reposition or re-align the 3D object in real time relative to real 3D objects that appear in the scene. Particularly, the generated 3D object has real 3D properties (e.g., depth, width, height, and length) which can be used to adjust a position of the 3D object relative to the 3D properties of objects in a real-world scene. For example, the 3D object can be placed on top of a table that appears in the scene and can be repositioned relative to a surface of the table. As the camera moves around, the system can continue tracking the 3D object relative to the table surface which makes the overall image containing real and virtual objects appear more realistic. In this way, the embodiments of the present disclosure allow a user to generate and modify frames of a video by adding 3D virtual objects and to interact with those objects in new ways.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

In some embodiments, the messaging client application 104 presents a graphical user interface (GUI) to a user for selecting or creating a given 2D image of an object. For example, the user can type text in 2D and input that 2D text as the selected 2D object image. The messaging client application 104 processes the 2D image of the object to generate a virtual 3D object from the 2D image. A user can activate a camera of the messaging client application 104 to view images of the user's real-world surroundings (e.g., the camera feed) in real-time. The user can instruct the messaging client application 104 to add the newly created virtual 3D object to the real-world images being captured by the camera. In this way, the user can add a virtual 3D object to real-world objects depicted in the camera feed. The user can manipulate the virtual 3D object to reposition the virtual object relative to the real-world objects. In some embodiments, the user can capture and store a video or image that includes the virtual 3D object and the real-world objects and share the video or image with another user of another messaging client application 104.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of such collections, the retrieval of a list of friends of a user of a client device 102, the retrieval of messages and content, the adding and deleting of friends to a social graph, the location of friends within a social graph, opening an application event (e.g., relating to the messaging client application 104).

The application server 112 hosts a number of applications and subsystems, including a messaging server application 114, an image processing system 116, and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user.

The application server 112 is communicatively coupled to a database server 118, which facilitates access to a database 120 in which is stored data associated with messages processed by the messaging server application 114.

Figure 2:
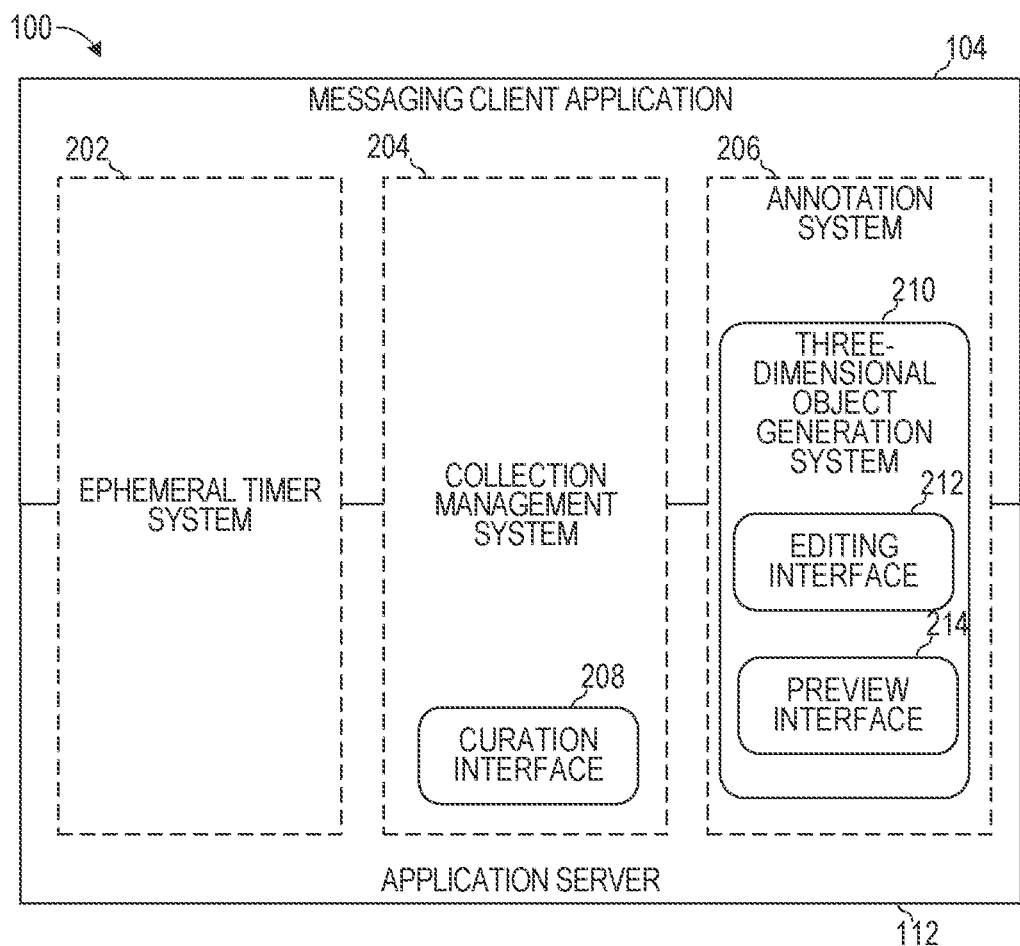

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204, and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a filter or lens) to the messaging client application 104. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying.

The audio and visual content or the visual effects can be applied to a media content item (e.g., a photo) at the client device 102. For example, the media overlay including text that can be overlaid on top of an image or video generated by the client device 102. In another example, the media overlay includes an identification of a location overlay (e.g., Venice beach), a name of a live event, or a name of a merchant overlay (e.g., Beach Coffee House).

The annotation system 206 includes a 3D object generation system 210 that provides functionality to receive a 2D object and generate virtual 3D objects, from the 2D object, and display and track the virtual 3D object, at positions relative to the client device 102, within a 3D space captured within a camera feed of the client device 102 (also referred to by those of ordinary skill in the art as a "camera stream," "a video stream," or a "video feed"). The virtual 3D objects generated, displayed, and tracked by the 3D object generation system 210 include 3D objects generated from a 2D object. A 3D object represents any 2D provided user generated content, curated content, images, text, video, animation or other visual item selected by a user or automatically identified. In an embodiment, the 2D object and the 3D object are simultaneously presented on the display. In such circumstances, the 3D object moves with and relative to the video feed in which the 3D object is positioned by the user while the 2D object remains stationary at a predetermined or user selected position on the display. In an embodiment, the 2D object includes a 2D video or animation. In such circumstances, the 2D video or animation is used to generate a 3D object that includes a 3D animation or 3D video which loops or cycles in the video feed in which the 3D object is positioned (e.g., a virtual dancing hot dog).

The 3D object generation system 210 provides functionality to enable users to author, edit, and preview 3D objects by supplying a 2D object. To this end, the 3D object generation system 210 includes an editing interface 212 and a preview interface 214. The editing interface 212 allows a user to author and select a 2D object (e.g., the user can select a 2D image or video from a list of images and videos or can manually type in a set of characters corresponding to text). The editing interface 212 enables users to edit the 2D object using keyboard input and other types of input including touch screen based gestures. For example, the user can change the scale, color scheme, size, or any other visual attribute of the 2D content. After the user is satisfied with the edited 2D object, the user can instruct the 3D object generation system 210 to create a virtual 3D object from the 2D object. The preview interface 214 allows a user to preview and review the generated 3D object before generating a message that includes the 3D object. The preview interface 214 may also enable the user to edit the presentation of the 3D objects (e.g., by changing a scale, orientation, or placement of the 3D object on the display screen). The 3D object generation system 210 creates the 3D object from the 2D object in accordance with the process described in connection with FIGS. 7 and 8.

The 3D object generation system 210 may cause a 3D object to be displayed (e.g., on a display of the client device 102) at positions in a 3D space captured within the camera feed based on a reference surface (e.g., the ground) detected in the 3D space. As will be discussed in further detail below, the 3D object generation system 210 comprises a redundant tracking system comprising a set of tracking subsystems configured to track a 3D object at a position in 3D space based on a set of tracking indicia and transition between tracking subsystems. The 3D object generation system 210 may further transition between tracking with six degrees of freedom (6DoF) and tracking with three degrees of freedom (3DoF) based on an availability of the tracking indicia. The 3D object generation system 210, in an embodiment, tracks and displays the 3D object at a position in 3D space captured within the camera feed while simultaneously presenting the corresponding 2D object in a static location. Namely, the 2D object is not tracked in 3D space as the camera changes positions in 3D space altering the camera feed in which the 3D object is presented.

Figure 3:
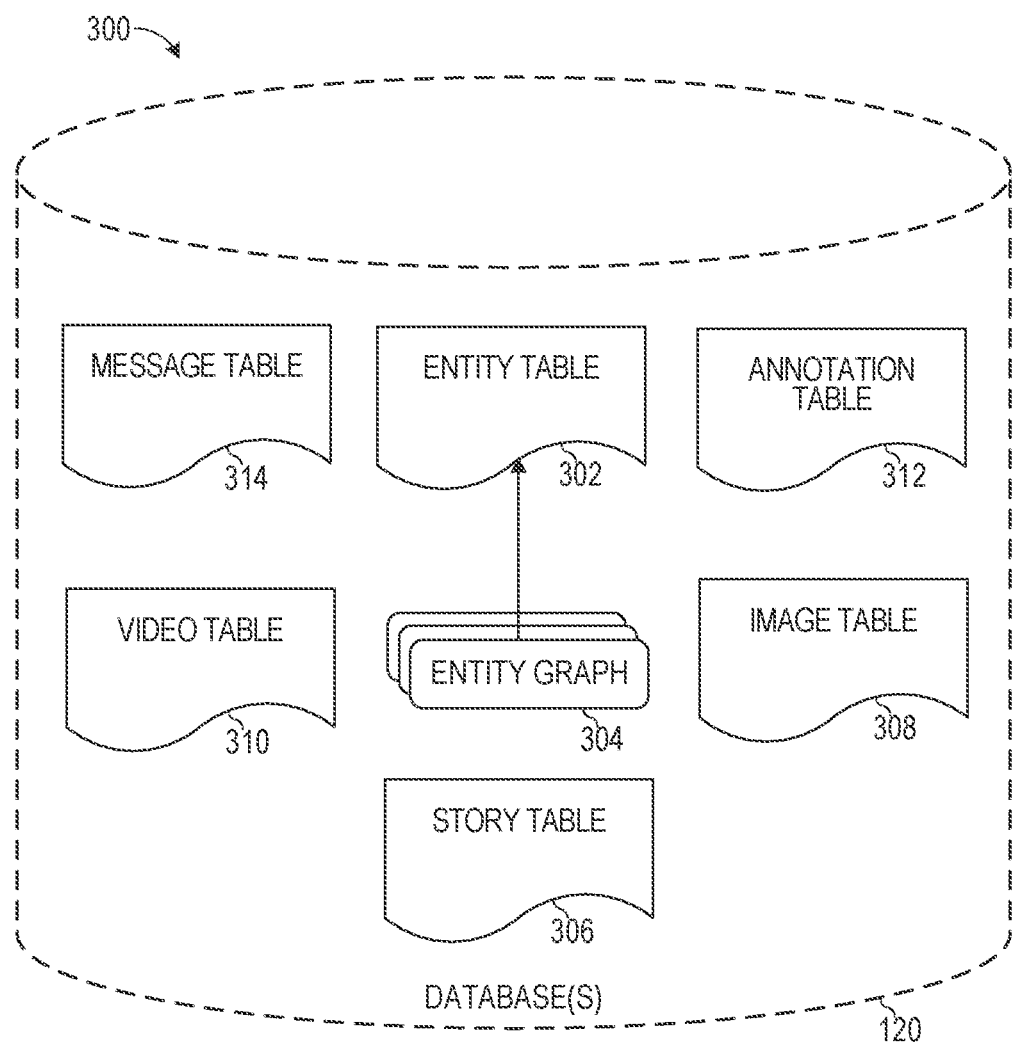

FIG. 3 is a schematic diagram 300 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, 2D and/or 3D objects, 3D object templates, 3D object textures, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interested-based, or activity-based, merely for example.

The database 120 also stores annotation data, in the example form of filters and lenses, in an annotation table 312. Filters and lenses for which data is stored within the annotation table 312 are associated with and applied to videos (for which data is stored in a video table 310) and/or images (for which data is stored in an image table 308). Filters are overlays that are displayed as overlaid on an image or video during presentation to a recipient user. Lenses, on the other hand, include real-time special effect and/or sounds that may be added to images of a camera feed while a user is composing a message. In comparison, filters are applied to an image or video after the image or video is captured at the client device 102 while a lens is applied to the camera feed of the client device 102 such that when an image or video is captured at the client device 102 with a lens applied, the applied lens is incorporated as part of the image or video that is generated. Filters and lenses may be of various types, including user-selected filters and lenses from a gallery of filters or a gallery of lenses presented to a sending user by the messaging client application 104 when the sending user is composing a message.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for which a record is maintained in the entity table 302). A user may create a "personal story" in the form of a collection of content that has been created and sent/broadcast by that user. To this end, the UI of the messaging client application 104 may include an icon that is user selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time, may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
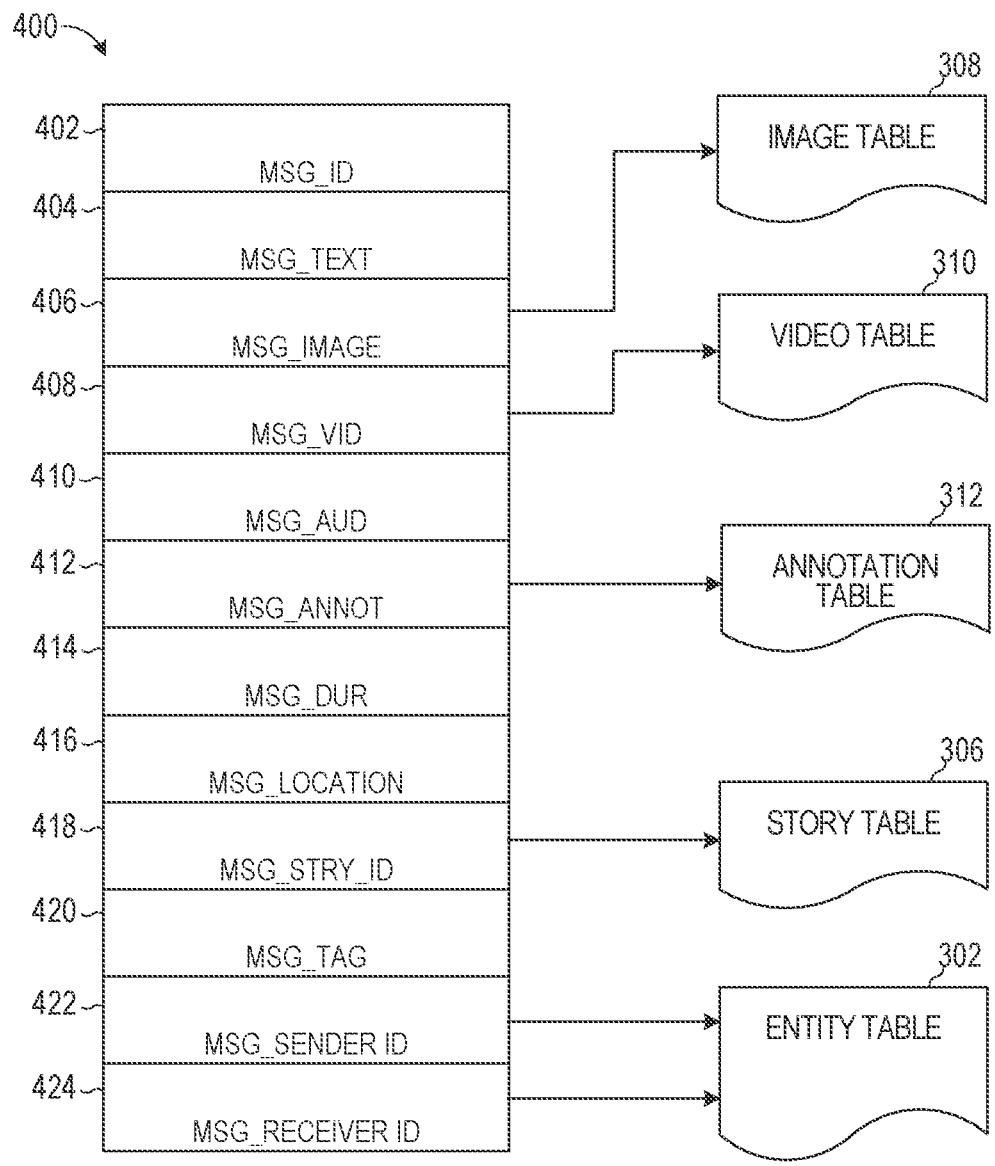

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from memory of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from the memory component of the client device 102, and that is included in the message 400.

A message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, with each of these parameter values being associated with respect to content items included in the content (e.g., a specific image into within the message image payload 406, or a specific video in the message video payload 408).

A message story identifier 418: identifier value identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address or device identifier) indicative of a user of the client device 102 to which the message 400 is addressed.

The contents (e.g. values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
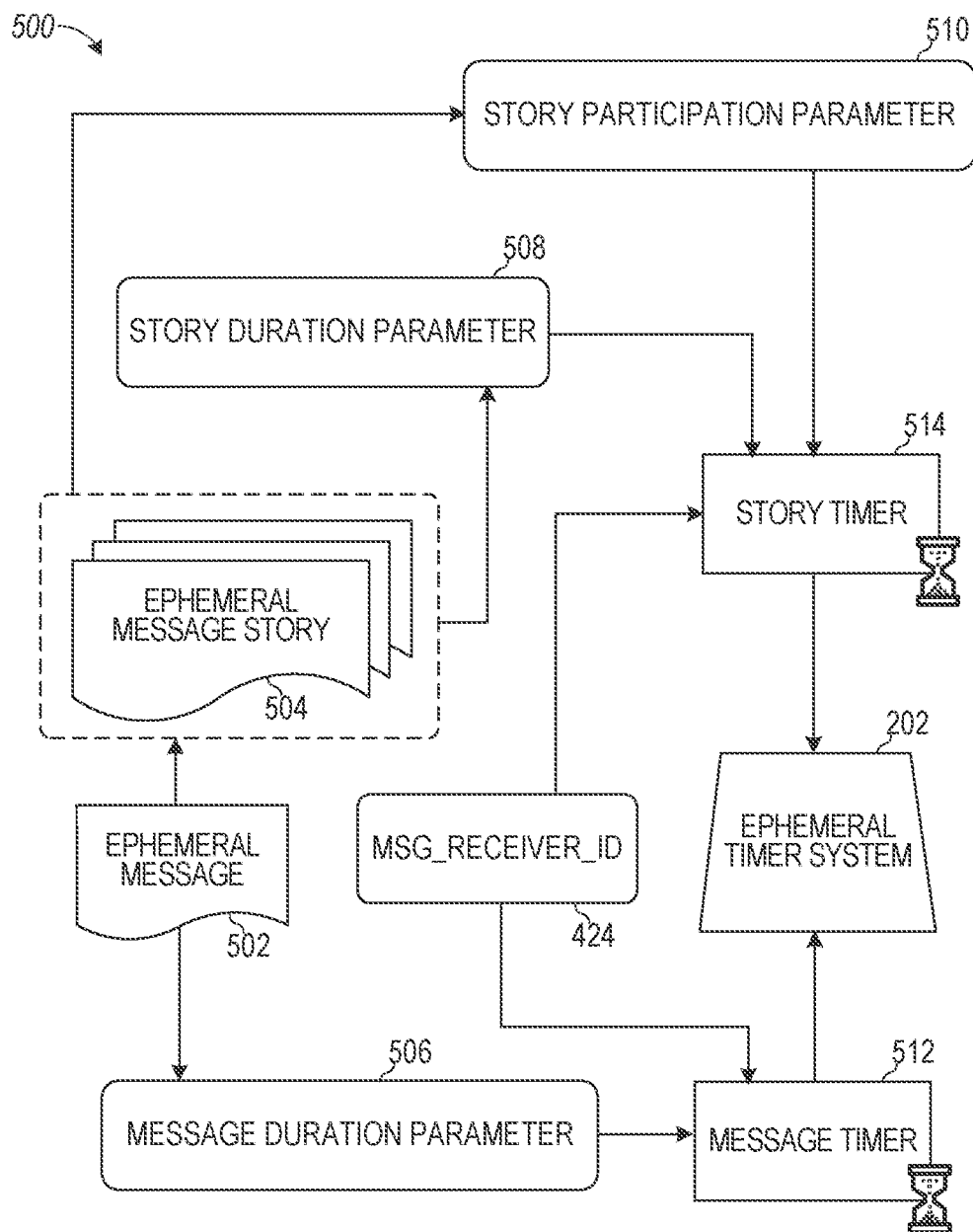

FIG. 5 is a schematic diagram illustrating an access-limiting process 500, in terms of which access to content (e.g., an ephemeral message 502, and associated multimedia payload of data) or a content collection (e.g., an ephemeral message story 504), may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is an application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal story, or an event story). The ephemeral message story 504 has an associated story duration parameter 508, a value of which determines a time-duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message story 504 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines, firstly, whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time-period specified by the story duration parameter 508. In a further embodiment, a certain ephemeral message 502 may expire, within the context of ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

Responsive to the ephemeral timer system 202 determining that an ephemeral message story 504 has expired (e.g., is no longer accessible), the ephemeral timer system 202 communicates with the messaging system 100 (and, for example, specifically the messaging client application 104) to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
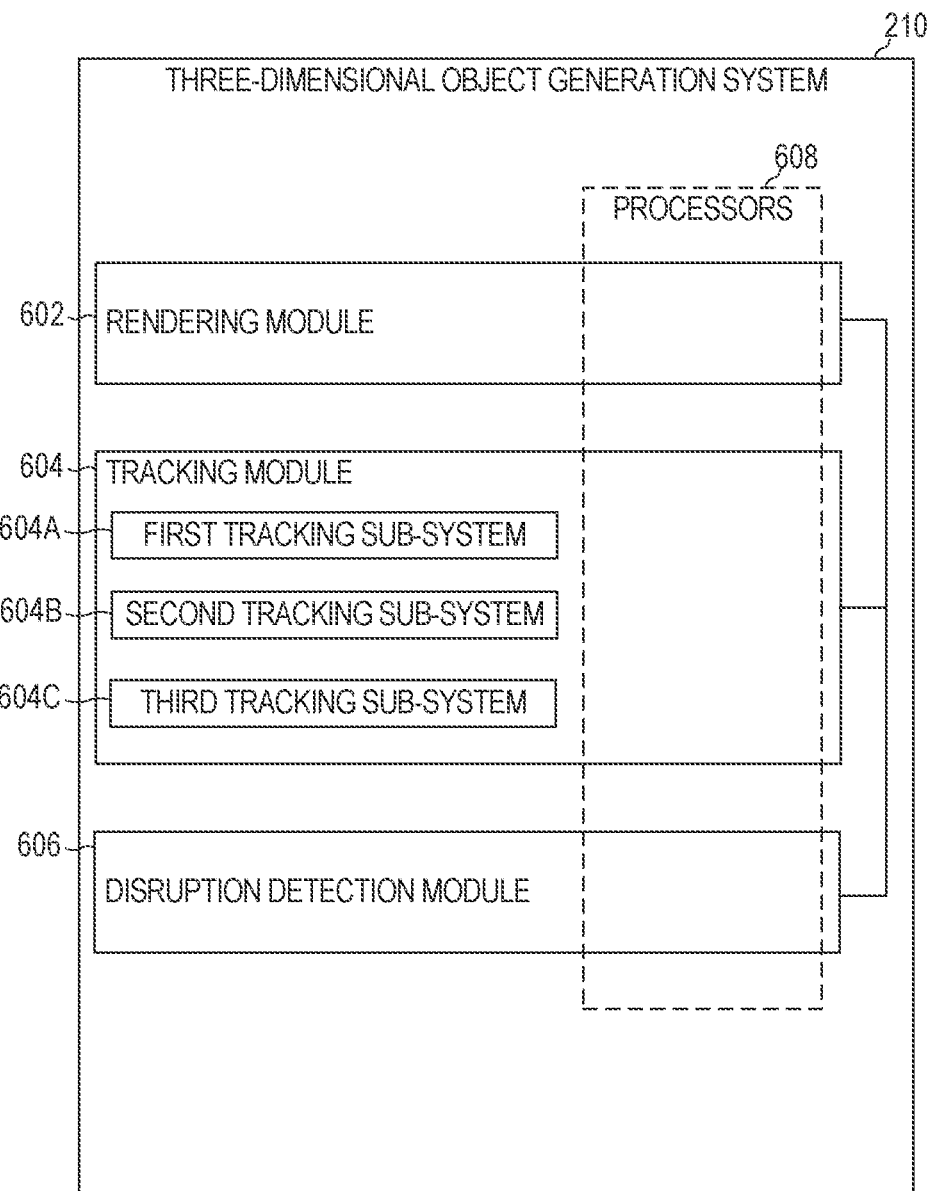

FIG. 6 is a block diagram illustrating functional components of the 3D object generation system 210 that configures the 3D object generation system 210 to render 3D objects from 2D objects in a 3D space depicted in a live camera feed. The 3D object generation system 210 is shown as including a rendering module 602, a tracking module 604, and a disruption detection module 606. The various components and modules of the 3D object generation system 210 may be configured to communicate with each other (e.g., via a bus, shared memory, or a switch). Although not illustrated in FIG. 6, in some embodiments, the 3D object generation system 210 may include or may be in communication with a camera configured to produce a camera feed comprising image data that includes a sequence of images (e.g., a video).

Any one or more of the components and modules described may be implemented using hardware alone (e.g., one or more of the processors 1504 (FIG. 15) of a machine) or a combination of hardware and software. For example, any component and modules described of the 3D object generation system 210 may physically include an arrangement of one or more of the processors 1504 (e.g., a subset of or among the one or more processors of the machine) configured to perform the operations described herein for that component. As another example, any component and module of the 3D object generation system 210 may include software, hardware, or both, that configure an arrangement of one or more processors 1504 (e.g., among the one or more processors of the machine) to perform the operations described herein for that component. Accordingly, different components and modules of the 3D object generation system 210 may include and configure different arrangements of such processors 1504 or a single arrangement of such processors 1504 at different points in time.

Moreover, any two or more components and modules of the 3D object generation system 210 may be combined into a single component or module, and the functions described herein for a single component or module may be subdivided among multiple components and modules. Furthermore, according to various example embodiments, components and modules described herein as being implemented within a single machine, database, or device may be distributed across multiple machines, databases, or devices.

The tracking system 604 may comprise a first tracking sub-system 604A, a second tracking sub-system 604B, and a third tracking sub-system 604C. Each tracking sub-system tracks the position of a 3D object within the 3D space based on a set of tracking indicia.

Tracking systems are subject to frequent tracking failure due to environmental conditions, user actions, unanticipated visual interruption between camera and object/scene being tracked, and so forth. Traditionally, such tracking failures would cause a disruption in the presentation of virtual objects in a 3D space. For example, a virtual object may disappear or otherwise behave erratically, thereby interrupting the illusion of the virtual object being presented within the 3D space. This undermines the perceived quality of the 3D experience as a whole.

Traditional tracking systems rely on a single approach (Natural Feature Tracking (NFT), Simultaneous Localization and Mapping (SLAM), Gyroscopic, etc.) that each have breaking points in real-world usage due to inaccurate sensor data, movement, loss or occlusion of visual marker, or dynamic interruptions to a scene. Further, each approach may have individual limitations in capability. For example, a gyroscopic tracking system can only track items with 3DoF. Further, utilization of a single tracking system provides inaccurate or unstable position estimation, due to inherent limitations of each individual system. For example, an NFT system may not provide sufficient pitch, yaw, or roll estimation due to the inaccuracies of visual tracking alone, while gyroscopic tracking systems provide inaccurate translation (up, down, left, right).

To address the foregoing issues with traditional tracking systems, the 3D object generation system 210 comprises multiple redundant tracking sub-systems 604A-C that enable seamless transitions between tracking sub-systems. The multiple redundant tracking sub-systems 604A-C address the issues with traditional tracking systems by merging multiple tracking approaches into a single tracking system 604. The tracking system 604 is able to combine 6DoF and 3DoF tracking techniques through combining and transitioning between multiple tracking systems based on the availability of tracking indicia (e.g., roll, pitch, yaw, natural features, etc.) tracked by the tracking systems. Thus, as the indicia tracked by any one tracking system becomes unavailable, the 3D object generation system 210 seamlessly switches between tracking in 6DoF and 3DoF, thereby providing the user with an uninterrupted experience. For example, in the case of visual tracking systems (e.g., NFT, SLAM), tracking indicia typically analyzed to determine orientation may be replaced with gyroscopic tracking indicia from a gyroscopic tracking system. This would thereby enable transitioning between tracking in 6DoF and 3DoF based on the availability of tracking indicia.

In some example embodiments, to transition between tracking in 6DoF and 3DoF, the 3D object generation system 210 gathers and stores tracking indicia within a tracking matrix that includes translation indicia (e.g., up, down, left, right) and rotation indicia (e.g., pitch, yaw, roll). The translation indicia gathered by an NFT system may thereby be extracted from the tracking matrix and utilized when future translation indicia gathered by the NFT system become inaccurate or unavailable. In the meantime, the rotation indicia continue to be provided by the gyroscope. In this way, when the mobile device loses tracking indicia, the tracked objects that are presented in the 3D space will not be changed abruptly at the frame when the tracking indicia are lost. Subsequently, when the target tracking object reappears in the screen, and a new translation $T_1$ is obtained, the translation part of the view matrix will then be taking advantage of the new translation $T_1$ and use $T_1$-$T_0$ as the translation of the view matrix.

The rendering module 602 of the 3D object generation system 210 is configured to obtain a 2D object and generate and render virtual 3D objects from the 2D objects in a 3D space captured within a live camera feed produced by a camera. For example, the rendering module 602 may generate a 3D object based on input of a 2D object received from a user (e.g., a 2D image or text) and render the 3D object in the 3D space captured within the live camera feed. In rendering the 3D object, the 3D object generation system 210 assigns the 3D object to a position in the 3D space based on a real-world reference surface detected in the 3D space. The rendering module 602 may simultaneously present the 2D object with the 3D object that has been generated in two different positions. The 2D object may be placed at a first user specified location and the 3D object corresponding to the 2D object may be placed at a second user specified location on the screen.

The 3D object generation system 210 may thereafter track the position of the 3D object relative to a user device in the 3D space by one or more tracking systems in 6DoF. For example, the one or more tracking systems of the 3D object generation system 210 may collect and analyze a set of tracking indicia (e.g., roll, pitch, yaw, natural features, etc.) in order to track the position of the 3D object relative to the user device in the 3D space with 6DoF. In such embodiments, the 3D object generation system 210 may transition between tracking systems based on the availability of the tracked indicia to maintain consistent tracking in 6DoF. In an embodiment where both the 2D and 3D objects are simultaneously presented, the 3D object may be tracked in 3D space while the 2D object remains at a static location and is not tracked and does not move in 3D space. In another embodiment, both the 3D object and the 2D object are both tracked in 3D space relative to each other as the live camera angle moves and changes to modify the presentation of the live camera feed in which the 3D object and 2D object are presented. In some embodiments, the 2D object is removed from display after a specified time interval or is not presented at all after the 3D object is generated and displayed in the camera feed. In such cases, the virtual 3D object, generated from the 2D object, is presented in the camera feed and the 2D object is not presented in the camera feed.

The disruption detection module 606 monitors tracking indicia to detect disruptions. Upon the disruption detection module 606 detecting an interruption of one or more indicia, such that tracking in 6DoF becomes unreliable or impossible, the 3D object generation system 210 transitions to tracking the 3D object in the 3D space in 3DoF in order to prevent an interruption of the display. For example, the 3D object generation system 210 may transition from a first tracking sub-system 604A (or first set of tracking sub-systems among the set of tracking sub-systems) that tracks the object in 6DoF to a second tracking sub-system 604B among the set of tracking sub-systems (or second set of tracking sub-systems), wherein the second tracking system is capable of tracking the 3D object with 3DoF in the 3D space, based on the tracking indicia available.

In some example embodiments, the set of tracking systems of the 3D object generation system 210 comprises a gyroscopic tracking system, an NFT system, and a SLAM tracking system. Each tracking system among the set of tracking systems may analyze tracking indicia to track a position of a virtual object within a 3D space. For example, to track a virtual object with 6DoF, the 3D object generation system 210 may require at least six tracking indicia to be available. As tracking indicia become obstructed or unavailable for various reasons, the 3D object generation system 210 may transition between the available tracking systems among the set of tracking systems in order to maintain 6DoF or transition to 3DoF if necessary.

It will be readily appreciated that the 3D object generation system 210 provides consistent rendered virtual objects (e.g., 3D captions or 3D animations, videos or images) in real-world 3D spaces in a wide variety of environments and situations. In many applications it can be desirable to provide firm consistency for the locations of these virtual objects as one or more users, cameras, or other tracking items move around in the environment. This can involve the recognition and use of a specific fixed reference point (e.g., a fixed surface) in the real-world environment. Not using a fixed reference point or item can result in floating or other undesirable inconsistencies in the rendering and presentation of the virtual objects.

To ensure firm consistency in the location of virtual objects, annotation data in the example form of a presentation lens that is specific for the 3D object tracking and rendering described herein may be employed. In particular, a surface aware lens is a presentation lens that identifies and references a real-world surface (e.g., the ground) for the consistent rendering and presentation of virtual objects in 3D space. The surface aware lens can be a specific portion or submodule within the rendering module 602. This surface aware lens of the rendering module 602 can be configured to recognize a reference surface based on visual camera content and may also utilize other device inputs (e.g., gyroscope, accelerometer, compass) to determine what is an appropriate surface within a 3D space depicted in a live camera feed. Once the reference surface has been determined, then a virtual 3D object can be positioned with respect to that reference surface. In an example, the reference surface in the 3D space is a ground surface. In this example, the 3D object generation system 210 renders the 3D object at a position in the 3D space such that the 3D object appears to be on or slightly above the 3D space.

Figure 7:
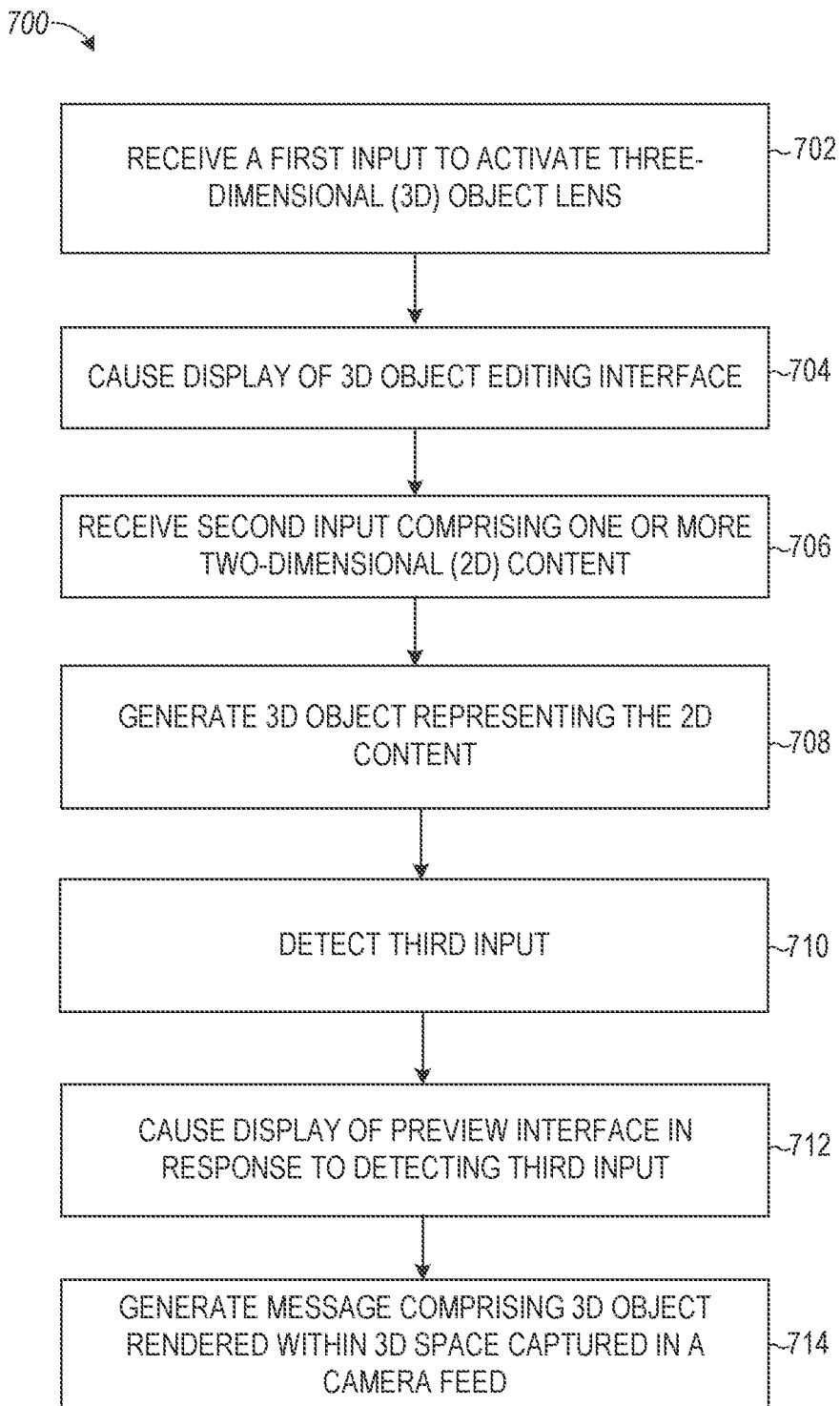
Figure 8:
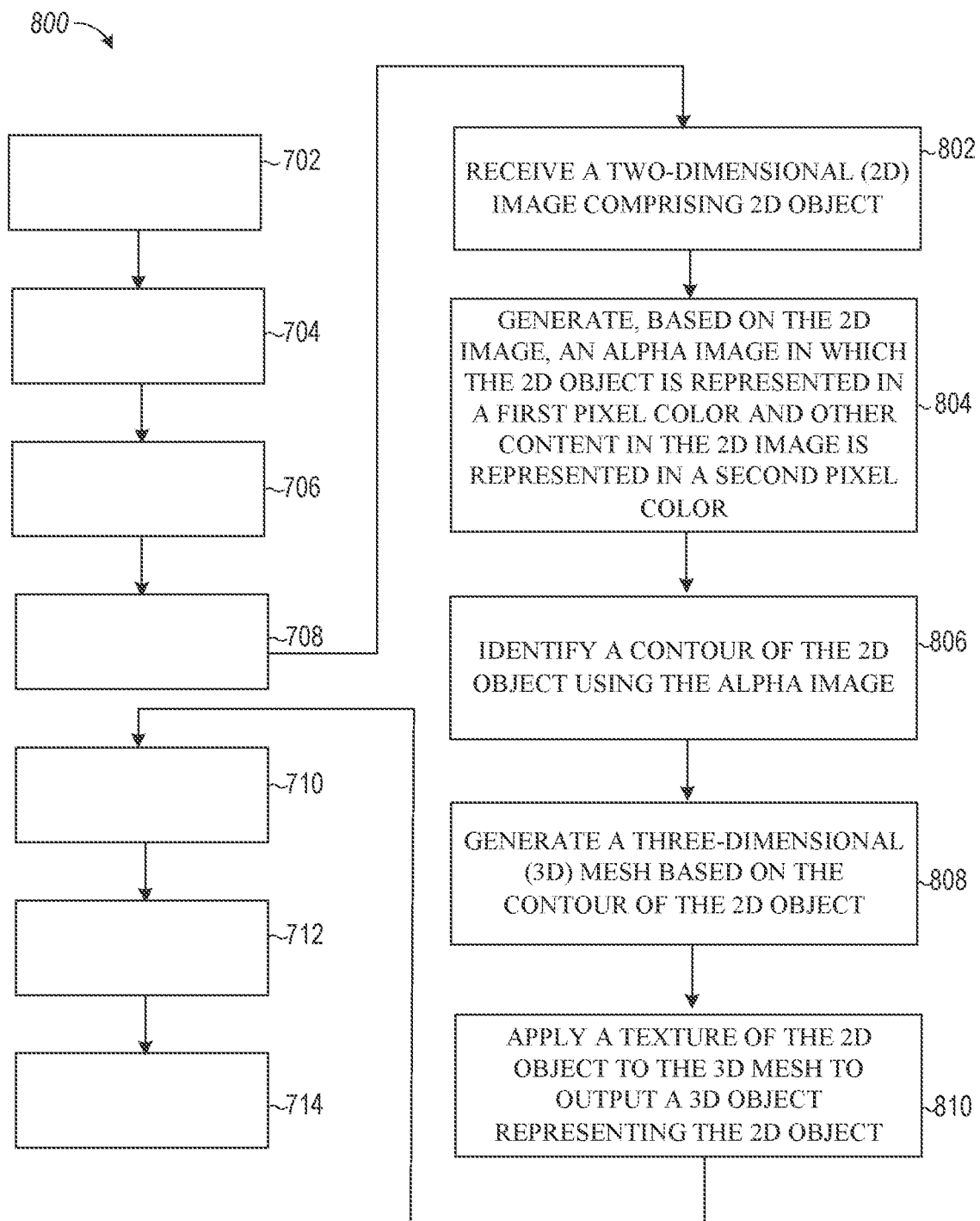

FIGS. 7-8 are flowcharts illustrating example operations of the 3D object generation system in performing methods 700 and 800 for generating a message that includes a 3D object created from a 2D object, according to example embodiments. The methods 700 and 800 may be embodied in computer-readable instructions for execution by one or more processors such that the operations of the methods 700 and 800 may be performed in part or in whole by the functional components of the 3D object generation system 210; accordingly, the methods 700 and 800 are described below by way of example with reference thereto. It shall be appreciated, however, that at least some of the operations of the methods 700 and 800 may be deployed on various other hardware configurations and the methods 700 and 800 are not intended to be limited to the 3D object generation system 210. Any one of the operations described in connection with methods 700 and 800 may be performed in a different order than that shown and described or entirely omitted.

At operation 702, the annotation system 206 receives a first input to activate a 3D object lens. The 3D object lens may be selected from a group of lenses.

At operation 704, the 3D object generation system 210 causes display of an editing interface 212 on the client device 102. The editing interface 212 enables a user to input a selection of a 2D object and modifications or edits to the 2D object that provide a basis for generating a 3D object from the 2D object. To this end, the editing interface 212 may include a keyboard or other input mechanism to enable the user to input a selection of 2D content (e.g., the one or more text characters, image selection, video selection, animation selection, and so forth). The 2D content input by the user is a displayed as a 2D overlay on top of a camera feed produced by a camera of the client device 102.

At operation 706, the 3D object generation system 210 receives a second input comprising one or more 2D objects input by a user of the client device using the editing interface 212.

At operation 708, the 3D object generation system 210 generates one or more 3D objects from the 2D content input by the user via editing interface 212. As noted above, a 2D representation of the one or more 2D objects input by the user are displayed in the editing interface 212 as an overlay on top of a camera feed produced by a camera of the client device 102. In an embodiment, the 3D object that is generated from the 2D content is presented simultaneously with the 2D representation of the content. In other embodiments, only the 3D object is presented and the 2D object is removed from display. Examples of the editing interface 212 are discussed below in connection with FIGS. 12-13.

At operation 710, the 3D object generation system 210 detects a third input and, in response to detecting the third input, the 3D object generation system 210 causes display of a preview interface 214, at operation 712. The third input may, for example, include a motion-based input such as a change of orientation of the client device 102. For example, if the user is pointing the camera of the client device 102 at an upward orientation, the 2D representation of the 2D content is presented in the editing interface 212. If the user changes the orientation of the camera to be facing downward, the 3D object generation system 210 may toggle from displaying the editing interface 212 to displaying the preview interface 214. The preview interface 214 includes a presentation of a 3D object generated based on the 2D content input by the user. The 3D object is a 3D representation of the 2D content input by the user. The 3D object may be rendered at a position in a 3D space captured in the camera feed that is based on a detected reference surface in the 3D space such as a ground or floor surface.

At operation 714, the messaging system 100 generates a message that includes one or more images with the 3D object applied. In generating the message, the messaging system 100 may record a video of a user specified or predetermined length (e.g., 3 seconds) that includes one or more images from the camera feed with the 3D object applied. The messaging system 100 may further apply one or more user specified filters to the recorded image(s) in generating the message.

As shown in the method 800 of FIG. 8, the method 700 may, in some embodiments, include operations 802, 804, 806, 808, and 810. Consistent with these embodiments, the operations 802, 804, 806, 808, and 810 may be performed as part of operation 708 (e.g., as a sub-routine or sub-operation) where the 3D object generation system 210 generates a virtual 3D object from an input 2D object and causes display of a preview interface comprising a presentation of the virtual 3D object within a real-world environment captured within a live or recorded camera feed.

Figure 9:
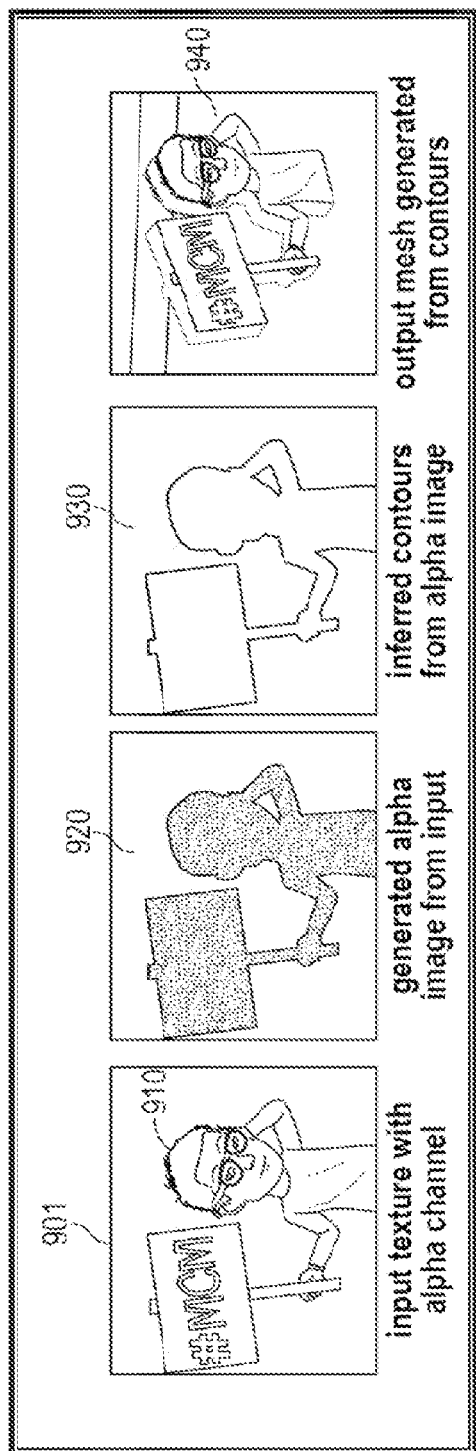

At operation 802, the rendering component 602 receives a 2D image comprising a 2D object. For example, the rendering component 602 receives, from the editing interface, a 2D image that includes text, an animated character, a person, or any other suitable user generated or pre-generated content. In an embodiment, the image is received as a square image of a predetermined size which includes the object or subject of interest within the square. As an example, FIG. 9 shows an input image 901 (e.g., a square image) that includes an object 910 within the image. In some embodiments, in response to receiving the input image 901, the rendering component 602 generates a texture map shown in FIGS. 10-11 (and described below) representing textures of the object 910 in the input image.

At operation 804, the rendering component 602 generates, based on the 2D image, an alpha image or mask in which the shape and location of the 2D object is represented in a first pixel color and other content in the 2D image is represented in a second pixel color. Specifically, the rendering component 602 generates an alpha image or mask in which the foreground content (e.g., the 2D object or target object) is represented in a first pixel color and background content in the 2D image is represented in a second pixel color. For example, the rendering component 602 processes the received square image 901 on a pixel by pixel basis. For each pixel, the rendering component 602 determines whether the pixel is transparent (corresponds to a transparent pixel value) or opaque (corresponds to a pixel value that is different from the transparent pixel value). In response to determining that a pixel is transparent, the rendering component 602 assigns the transparent pixel a white color. In response to determining that a pixel is opaque, the rendering component 602 assigns the opaque pixel a black color. The rendering component 602 generates an alpha image that includes the white and black pixels at the corresponding locations of their corresponding transparent or opaque pixels. An example alpha image 920 is shown in FIG. 9. As shown, the object 910 is comprised of opaque pixels and is represented by all black pixels in the alpha image 920 while pixels outside of the object are transparent and are represented by white pixels in the alpha image 920.

At operation 806, the rendering component 602 identifies a contour or outline of the 2D object using the alpha image. For example, the rendering component 602 identifies a black-white boundary in the alpha image 920. Particularly, the rendering component 602 determines where the pixels in the alpha image transition from black to white. The point of transition is marked with another pixel (e.g., a white or grey pixel) and a contour image 930 is generated to represent all of the points of transition between white and black pixels. The points of transition correspond to the contour of the 2D object 910 in the input image 901. In some embodiments, the points of transition are normalized to be a smooth path around the 2D object 910 using a normalizing process.

At operation 808, the rendering component 602 generates a 3D mesh based on the contour of the 2D object. For example, the rendering component 602 normalizes the contour and identifies segments of the normalized contour of the 2D object in the contour image 930. For each segment, the rendering component 602 generates a polygon edge to include in a 3D mesh corresponding to the 2D object 910. In an embodiment, the rendering component 602 rotates the 2D object 910 by a predetermined number of degrees (e.g., 20 degrees) around its axis and appends the generated polygon edges around the contour of the 2D object 910. This results in a 3D mesh corresponding to the 2D object 910 as shown in 3D mesh 940 of FIG. 9.

Figure 10:
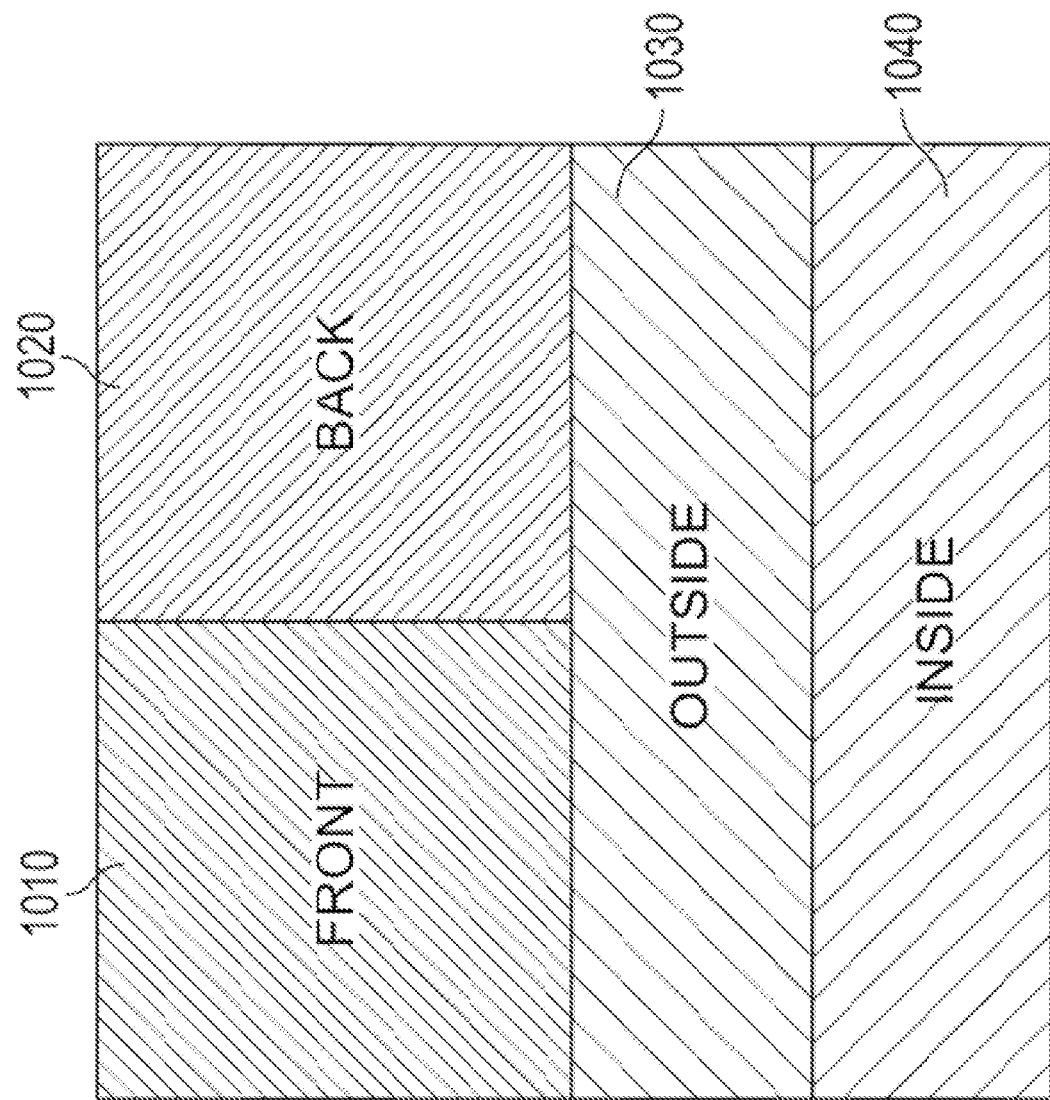
Figure 11:
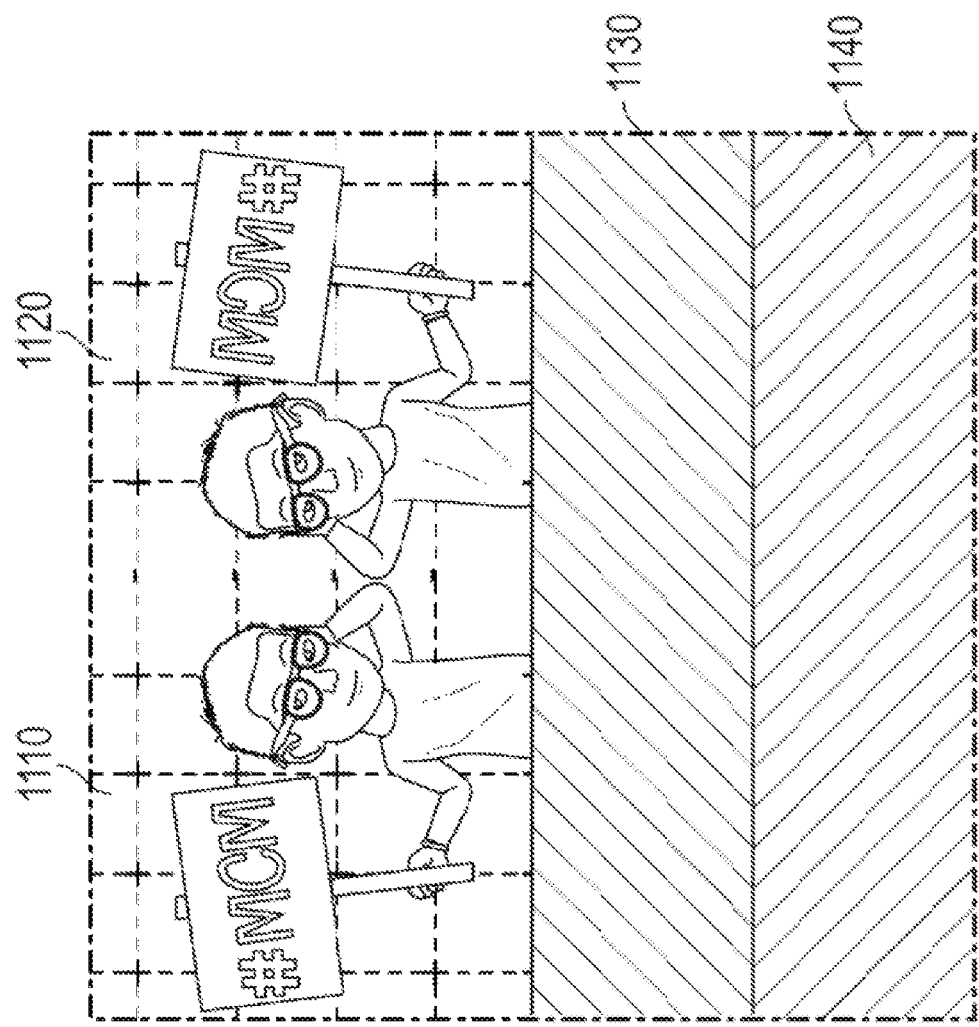

At operation 810, the rendering component 602 applies a texture of the 2D object to the 3D mesh to output a 3D object representing the 2D object. For example, the rendering component 602 retrieves a material that maps an input texture to UV positions of the 3D mesh. As shown in FIG. 10, the material includes a front region 1010, a back region 1020, an outside region 1030 and an inside region 1040. The front region 1010 identifies a set of UV positions in the 3D mesh corresponding to the front of the 3D object, the back region 1020 identifies a set of UV positions in the 3D mesh corresponding to the back of the 3D object, the outside region 1030 identifies a set of UV positions in the 3D mesh corresponding to the outside of the 3D object, and the inside region 1040 identifies a set of UV positions in the 3D mesh corresponding to the inside of the 3D object.

Specifically, the rendering component 602 uses a UV mapping process to map the regions of the material to corresponding portions of the 3D mesh. Namely, UV mapping is the 3D modelling process of projecting a 2D image to a 3D model's surface for texture mapping. The letters "U" and "V" denote the axes of the 2D texture because "X", "Y," and "Z" are already used to denote the axes of the 3D object in model space. For example, the UV mapping process involves assigning pixels in the material portions to surface mappings on the polygon, such as by copying a triangular piece of the material portions and pasting it onto a triangle on the 3D object. UV coordinates (e.g., texture coordinates) can be generated for each vertex in the 3D mesh.

The rendering component 602 applies a first texture from the front region 1010 to a front portion of the 3D mesh, applies a second texture from the inside region 1040 to an inside portion of the 3D mesh; applies a third texture from the outside region 1030 to an outside portion of the 3D mesh; and applies a fourth texture from the back region 1020 to a back portion of the 3D mesh. For example, the rendering component 602 applies a first texture 1110 (FIG. 11) from the front region 1010 to a front portion of the 3D mesh; applies a second texture 1140 from the inside region 1040 to an inside portion of the 3D mesh; applies a third texture 1130 from the outside region 1030 to an outside portion of the 3D mesh; and applies a fourth texture 1120 from the back region 1020 to a back portion of the 3D mesh. The first, second, third, and fourth textures are applied by overlaying the first, second, third, and fourth textures over portions of the 3D mesh corresponding to the UV positions indicated by the map of the material.

In some embodiments, at least the first and fourth textures 1110 and 1120 for the material are generated from the 2D object provided by the user, and the second and third textures 1130 and 1140 are previously generated from a preselected or predetermined pattern. In some embodiments, the pattern for the second and third textures 1130 and 1140 is selected based on the type of 2D object that is received. For example, if the 2D object is an image, the second and third textures 1130 and 1140 correspond to a first pair of opposite patterns (e.g., lines in a first diagonal direction and lines in an opposite diagonal direction). If the 2D object is text, the second and third textures 1130 and 1140 correspond to a second pair of patterns (e.g., hashmarks with different densities). In some embodiments, the fourth texture 1120 or the texture for the back region 1020 is generated by generating a mirror image of the first texture 1110 for the front region 1010 by mirroring the first texture 1110 for the front region 1010 vertically.

In some embodiments, the textures of the material vary over time based on a context of the device on which the 3D object is generated. For example, if the 3D object is generated at a first point in time during the morning hours, brighter color textures can be used and if the same 3D object is generated at a second point in time during the evening hours, darker color textures can be used. In some embodiments, only the first texture from the front region 1010 and the fourth texture from the back region 1020 are adjusted based on context of the device. For example, the background shown in the first and fourth textures may vary based on context of the device on which the 3D object is presented. Specifically, if the device is determined to be at a high altitude indicating that the user is flying on an airplane, backgrounds shown in the first and fourth textures can change to illustrate a sky. On the other hand, if the device is determined to be at a low altitude but in a geographical position where a body of water is present indicating that the user is on a boat, backgrounds shown in the first and fourth textures can change to illustrate an ocean.

In some embodiments, the various textures that are applied to the 3D object are presented to the user as the user manipulates the 3D object in 3D space. For example, the 3D object can be presented to the user in the real-world environment depicted in the camera feed. The 3D object can initially be presented in a front-facing arrangement such that the back of the 3D object is not visible. As such, the fourth texture from the back region 1020 is not visible. The user can move the camera in the real-world around the 3D object and/or can turn or rotate the 3D object about its vertical axis. As the user moves the camera to view the back of the object or as the 3D object is rotated, the fourth texture from the back region 1020 becomes more and more visible. Once the user rotates the object 180 degrees or walks with the camera around the object to view the back of the object, the fourth texture from the back region 1020 is completely visible and the first texture from the front region 1010 is no longer visible. As another example, the user can rotate the 3D object about its horizontal axis or position the camera to view the bottom of the object. In such cases, the second texture from the inside region 1040 becomes more and more visible until the object is rotated 90 degrees about its horizontal axis of when the camera is positioned to full view of the bottom of the object.

In some embodiments, in addition to, or alternative to, generating the 3D object from the 2D object using the extrusion process in which the 3D object is generated based on the inferred contours of the alpha image and applying a 3D mesh and/or texture to the inferred contours as discussed above, the 3D object can be generated directly from the 2D input image 901, directly from the inferred contours, directly from the alpha image, or any combination thereof without applying the 3D mesh. By generating the 3D object directly from the input image 901, less computational resources are needed and the computational complexity is reduced. This enhances the battery life and increases the speed at which the 3D object is generated. In some embodiments, the rendering component 602 determines whether processing capabilities of the client device 102 exceed a threshold or correspond to a specified minimum set of processing capabilities. For example, a determination can be made as to whether the processor of the client device 102 has a processing speed that exceeds a certain range and has a certain amount of free and available memory space. If the processing capabilities of the client device 102 exceed the threshold or correspond to the specified minimum set of processing capabilities, the rendering component 602 can employ the extrusion process in which the 3D object is generated based on the inferred contours of the 2D alpha image and applying a 3D mesh and/or texture to the inferred contours. If the processing capabilities of the client device 102 fail to exceed or correspond to the threshold or fail to correspond to the specified minimum set of processing capabilities, the rendering component 602 can generate the 3D object directly from the 2D input image 901 using a process that requires less computation resources.

In one embodiment, to generate the 3D object directly from the 2D object, the 2D object 910 depicted in the image 901 is rotated in 3D space a specified number of degrees (e.g., 20 degrees) about its vertical axis. Arrays of pixels of a specified lengths are extended from a first position (e.g., the front of the 2D object) to a second position (e.g., the back of the object). Each array of pixels replicates the color of the pixel or the pixel value from which the array extends. For example, a first pixel from a top portion of the 2D object has a first value. In such cases, an array that is 20 pixels long or 1 centimeter long can be extended from the first pixel towards the back or into the z-axis. The colors of the 20 pixels in the array are also the first value. A second pixel that is adjacent to the first pixel is then selected and another array that is the same or shorter length can be extended from the second pixel towards the back or into the z-axis. The pixels in this array that extends from the second pixel have the same value as the second pixel. In some embodiments, only a portion of the arrays are visible and as the 3D object is rotated in 3D space until other portions of the other arrays become visible.

In one embodiment, to generate the 3D object directly from the 2D object, directly from the inferred contours, directly from the alpha image, or any combination thereof without applying the 3D mesh, the 2D object 910 is duplicated a specified number of times. Duplicates of the 2D object are stacked behind the 2D object and edges of the duplicates become visible as the virtual 3D object is rotated or as a camera moves around the object. This is referred to as the stacked 2D duplication process for generating a virtual 3D object. Each duplicate of the 2D object is positioned behind another duplicate and its position in 3D space is offset by a specified number of pixels (e.g., 5 or 10 pixels). In this way, a new duplicate is positioned behind the initial 2D object every specified number of pixels.

Figure 13:
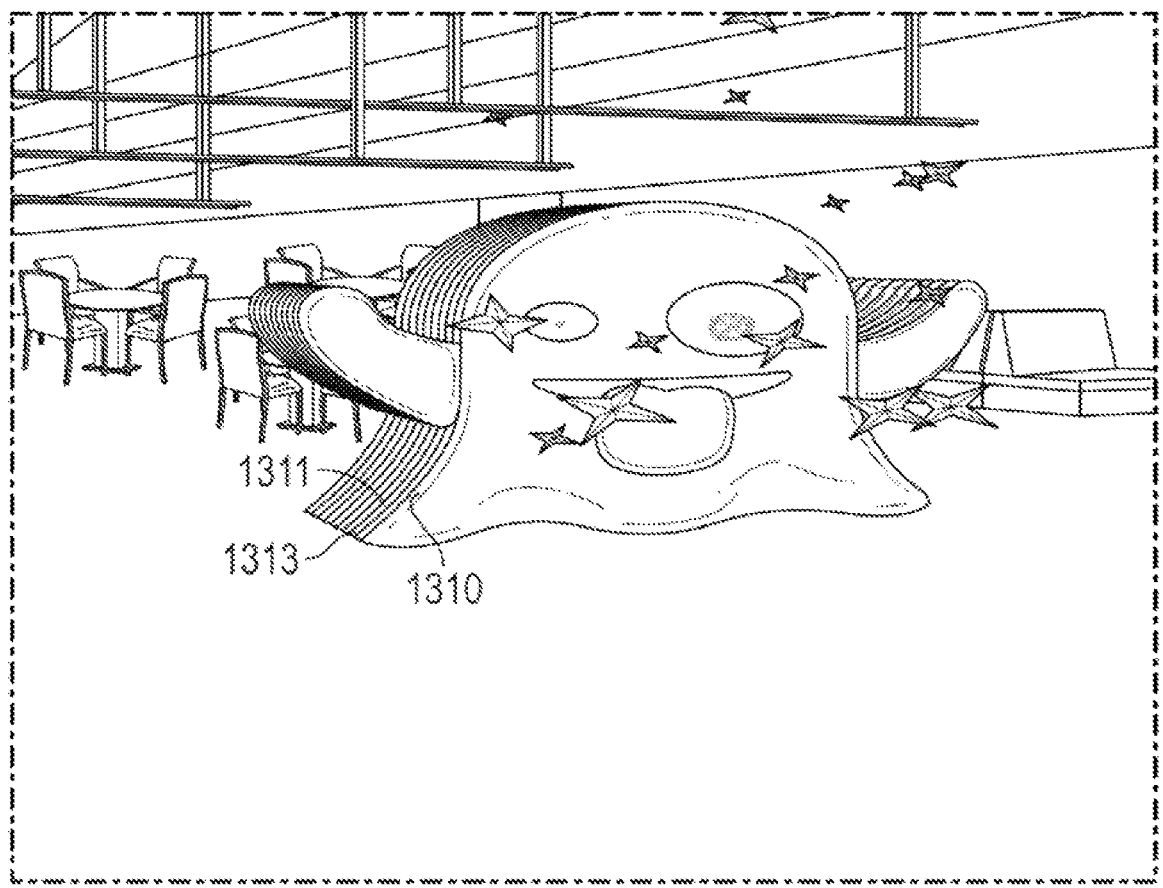

FIG. 13 shows an illustrative 3D object in which duplicates of the 2D object become visible as the 3D object is rotated about its vertical axis. Specifically, the front of the 2D object is shown by a first instance 1310 of the 2D object. A space 1313 is inserted behind the first instance 1310 that is 5 or 10 pixels deep in 3D space and can be represented by pixels having a grey value. Behind the space 1313, a second instance 1311 of the 2D object is presented in 3D space and becomes visible as the 3D object is rotated about its vertical axis. If the 3D object is manipulated to rotate the 3D object 90 degrees about its vertical axis, outside edges (or pixel values along the edges) of all of the duplicates of the 2D images and the offsets having the gray pixel values become fully visible. As one example, edges of 20 different duplicates of the 2D image become visible in this scenario and 20 gray scale offset pixel values separating the duplicates from each other become visible as the 3D object is rotated about its vertical axis. Thus, rather than using a 3D mesh to extend edges of the 2D object in 3D space in a visually and spatially continuous manner, a virtual 3D object is created using a discontinuous duplication of the 2D objected. In an embodiment, as the number of duplicates that are stacked behind the 2D object in 3D space increases, a 3D object created using the 3D mesh applied to the 2D object contours becomes virtually indistinguishable from the 3D object created using the stacked 2D duplication process.

Figure 12:
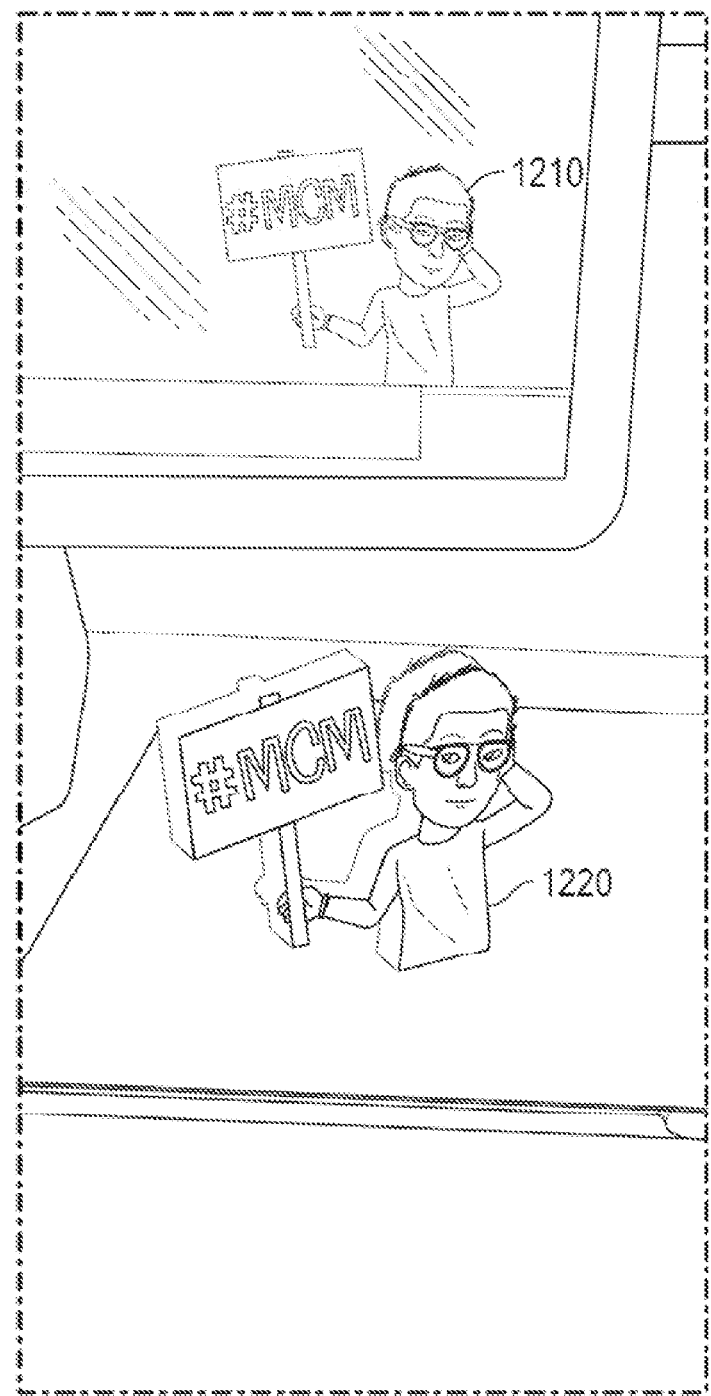

FIGS. 12-13 are interface diagrams that illustrate a user interface provided by the messaging system 100, according to some embodiments. The user interface includes a lens carousel from which a user may initiate functionality of the 3D object generation system 210 through selection of a lens or edit icon or option (not shown). Consistent with some embodiments, upon receiving a user selection of the lens or edit icon or option, a user is presented with an editing interface configured for creating and editing a 3D object from a selected 2D object. For example, upon receiving a user selection of the option, the 3D object generation system 210 may cause display of a user interface illustrated in FIGS. 12-13. As shown in FIG. 12, the user interface presents a 2D object 1210 selected by the user that provide a basis for a 3D object 1220 to be rendered within the 3D space.

As shown in FIG. 12, upon receiving input from the user of a 2D object 1210, the user interface is updated to present a representation of the 2D object 1210. A user of the client device 102 may access a preview interface (e.g., preview interface 214) that includes a preview of the 3D object by providing an input such as changing an orientation of the client device 102 (e.g., changing the orientation of the camera from pointing upward to pointing downward) or by selecting an interface element (e.g., a button) presented within the user interface of the client device 102. FIG. 12 illustrates an interface that includes a preview of a 3D object 1220 generated based on the user supplied 2D object 1210. Upon detecting a reference surface (e.g., the ground) in the 3D space captured within the camera feed (e.g., based on a change of orientation of the computing device), the 3D object 1220 based on the 2D object 1210 is rendered within the 3D space captured within the camera feed. As shown, the 3D object 1220 is rendered with respect to a reference surface in the 3D space. That is, the 3D object 1220, as rendered, is oriented within the 3D space at a position relative to the reference surface (e.g., the ground). Rendering the 3D object 1220 in this manner makes it appear to be attached to a real-world surface captured within the camera feed.

A 3D object can be rendered within a 3D space at a first position and the 3D object is rendered such that it appears attached to a reference surface (e.g., the ground). Through appropriate interaction with the 3D object (e.g., a select and drag gesture), the user may move the 3D object such that it is rendered at a second position within the 3D space.

A user may change a scale and rotation of the 3D object through appropriate interaction with the 3D object. For example, the user can perform a pinch and rotate gesture with two fingers on an input touch screen display on which the camera feed is displayed to scale and rotate the 3D object on the reference surface without affecting a layout of the 3D object.

Once the user is satisfied with the placement and look of a 3D object, the user may create a message that includes the 3D object and one or more images from the camera feed. For example, the user may use the client device 102 to record a video in which the 3D object is rendered such that it appears attached to a surface in the video. While recording the video, the 2D object, that is simultaneously presented with the 3D object, can be omitted such that only the 3D object remains visible in the recorded video.

As part of creating the message, the user may be presented with a menu or other interface element that allows the user to select and apply one or more filters to apply to images of the camera feed along with the 3D object rendered in the 3D space captured within the camera view.

Figure 14:
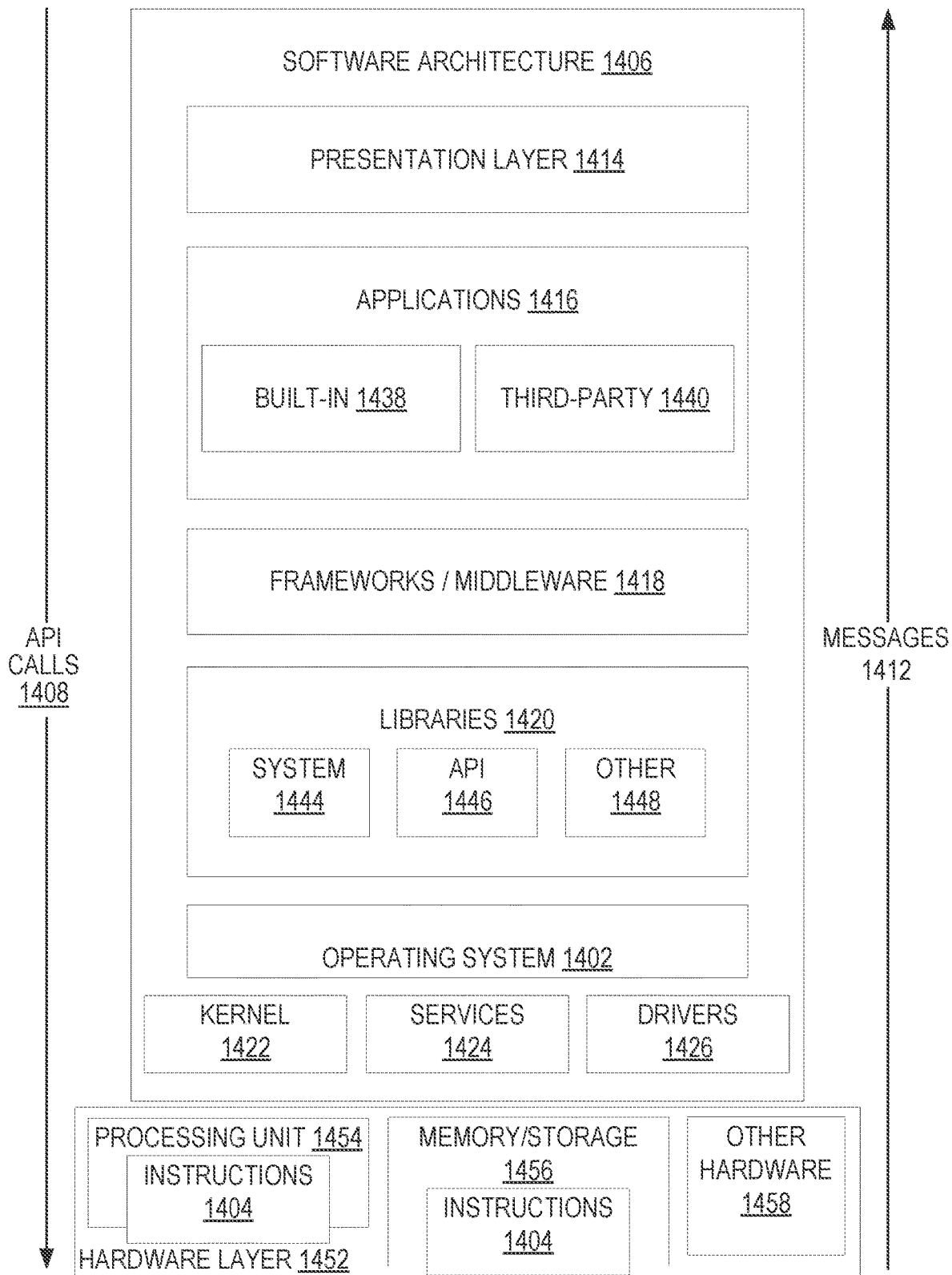

FIG. 14 is a block diagram illustrating an example software architecture 1406, which may be used in conjunction with various hardware architectures herein described. FIG. 14 is a non-limiting example of a software architecture and it will be appreciated that many other architectures may be implemented to facilitate the functionality described herein. The software architecture 1406 may execute on hardware such as machine 1500 of FIG. 15 that includes, among other things, processors 1504, memory 1514, and input/output (I/O) components 1518. A representative hardware layer 1452 is illustrated and can represent, for example, the machine 1500 of FIG. 15. The representative hardware layer 1452 includes a processing unit 1454 having associated executable instructions 1404. Executable instructions 1404 represent the executable instructions of the software architecture 1406, including implementation of the methods, components and so forth described herein. The hardware layer 1452 also includes memory and/or storage modules memory/storage 1456, which also have executable instructions 1404. The hardware layer 1452 may also comprise other hardware 1458.

In the example architecture of FIG. 14, the software architecture 1406 may be conceptualized as a stack of layers where each layer provides particular functionality. For example, the software architecture 1406 may include layers such as an operating system 1402, libraries 1420, applications 1416, frameworks/middleware 1418, and a presentation layer 1414. Operationally, the applications 1416 and/or other components within the layers may invoke API calls 1408 through the software stack and receive a response 1412 as in response to the API calls 1408. The layers illustrated are representative in nature and not all software architectures have all layers. For example, some mobile or special purpose operating systems may not provide a frameworks/middleware 1418, while others may provide such a layer. Other software architectures may include additional or different layers.

The operating system 1402 may manage hardware resources and provide common services. The operating system 1402 may include, for example, a kernel 1422, services 1424, and drivers 1426. The kernel 1422 may act as an abstraction layer between the hardware and the other software layers. For example, the kernel 1422 may be responsible for memory management, processor management (e.g., scheduling), component management, networking, security settings, and so on. The services 1424 may provide other common services for the other software layers. The drivers 1426 are responsible for controlling or interfacing with the underlying hardware. For instance, the drivers 1426 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1420 provide a common infrastructure that is used by the applications 1416 and/or other components and/or layers. The libraries 1420 provide functionality that allows other software components to perform tasks in an easier fashion than to interface directly with the underlying operating system 1402 functionality (e.g., kernel 1422, services 1424 and/or drivers 1426). The libraries 1420 may include system libraries 1444 (e.g., C standard library) that may provide functions such as memory allocation functions, string manipulation functions, mathematical functions, and the like. In addition, the libraries 1420 may include API libraries 1446 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1420 may also include a wide variety of other libraries 1448 to provide many other APIs to the applications 1416 and other software components/modules.

The frameworks/middleware 1418 (also sometimes referred to as middleware) provide a higher-level common infrastructure that may be used by the applications 1416 and/or other software components/modules. For example, the frameworks/middleware 1418 may provide various GUI functions, high-level resource management, high-level location services, and so forth. The frameworks/middleware 1418 may provide a broad spectrum of other APIs that may be utilized by the applications 1416 and/or other software components/modules, some of which may be specific to a particular operating system 1402 or platform.

The applications 1416 include built-in applications 1438 and/or third-party applications 1440. Examples of representative built-in applications 1438 may include, but are not limited to, a contacts application, a browser application, a book reader application, a location application, a media application, a messaging application, and/or a game application. Third-party applications 1440 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1440 may invoke the API calls 1408 provided by the mobile operating system (such as operating system 1402) to facilitate functionality described herein.

The applications 1416 may use built in operating system functions (e.g., kernel 1422, services 1424, and/or drivers 1426), libraries 1420, and frameworks/middleware 1418 to create user interfaces to interact with users of the system. Alternatively, or additionally, in some systems interactions with a user may occur through a presentation layer, such as presentation layer 1414. In these systems, the application/component "logic" can be separated from the aspects of the application/component that interact with a user.

Figure 15:
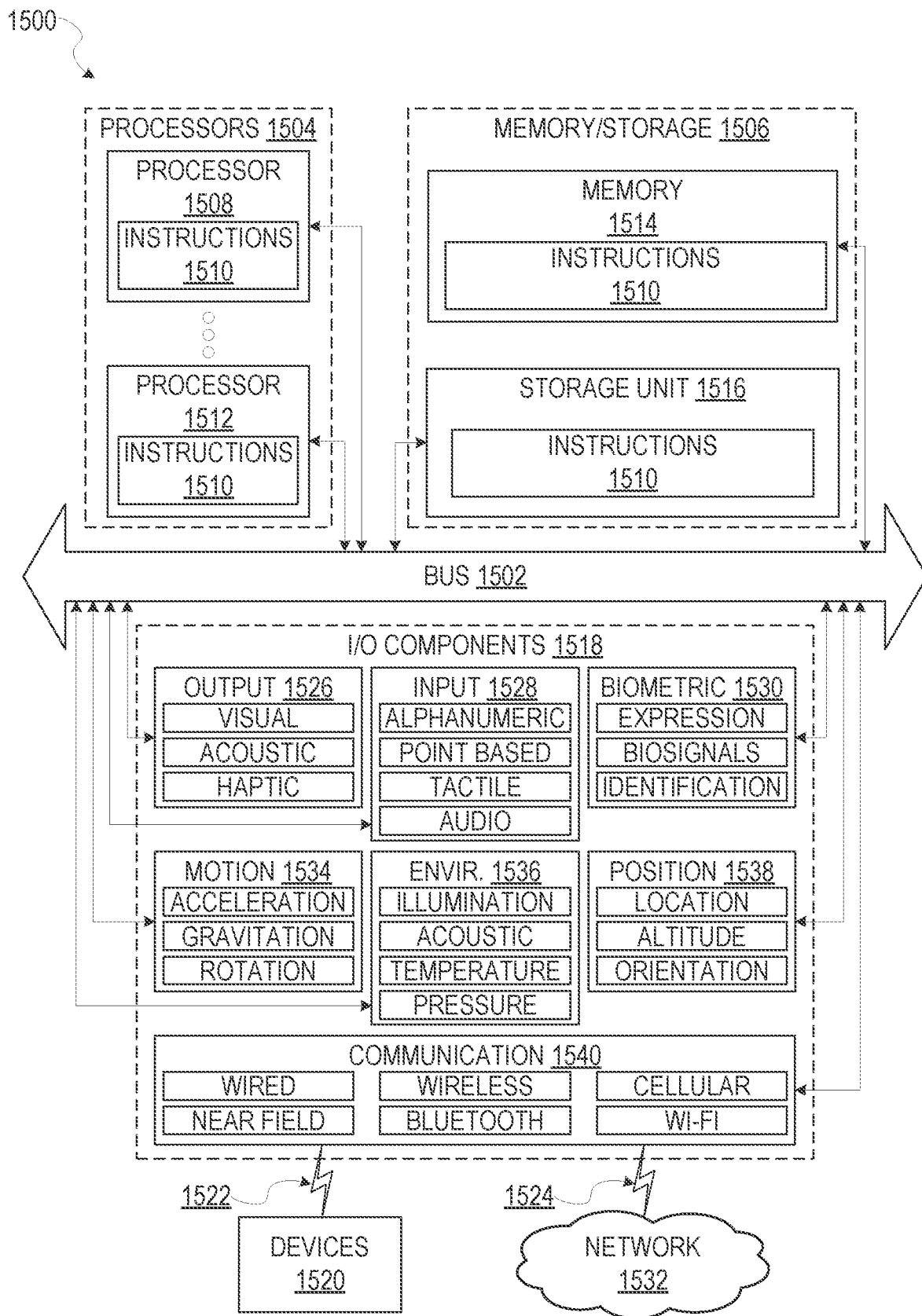

FIG. 15 is a block diagram illustrating components of a machine 1500, according to some example embodiments, able to read instructions from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1510 (e.g., software, a program, an application, an applet, an app, or other executable code) for causing the machine 1500 to perform any one or more of the methodologies discussed herein may be executed. As such, the instructions 1510 may be used to implement modules or components described herein. The instructions 1510 transform the general, non-programmed machine 1500 into a particular machine 1500 programmed to carry out the described and illustrated functions in the manner described. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1510, sequentially or otherwise, that specify actions to be taken by machine 1500. Further, while only a single machine 1500 is illustrated, the term "machine" shall also be taken to include a collection of machines that individually or jointly execute the instructions 1510 to perform any one or more of the methodologies discussed herein.

The machine 1500 may include processors 1504, memory/storage 1506, and I/O components 1518, which may be configured to communicate with each other such as via a bus 1502. In an example embodiment, the processors 1504 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1508 and a processor 1512 that may execute the instructions 1510. The term "processor" is intended to include multi-core processors 1504 that may comprise two or more independent processors (sometimes referred to as "cores") that may execute instructions contemporaneously. Although FIG. 15 shows multiple processors, the machine 1500 may include a single processor with a single core, a single processor with multiple cores (e.g., a multi-core processor), multiple processors with a single core, multiple processors with multiple cores, or any combination thereof.

The memory/storage 1506 may include a memory 1514, such as a main memory, or other memory storage, and a storage unit 1516, both accessible to the processors 1504 such as via the bus 1502. The storage unit 1516 and memory 1514 store the instructions 1510 embodying any one or more of the methodologies or functions described herein. The instructions 1510 may also reside, completely or partially, within the memory 1514, within the storage unit 1516, within at least one of the processors 1504 (e.g., within the processor's cache memory), or any suitable combination thereof, during execution thereof by the machine 1500. Accordingly, the memory 1514, the storage unit 1516, and the memory of processors 1504 are examples of machine-readable media.

The I/O components 1518 may include a wide variety of components to receive input, provide output, produce output, transmit information, exchange information, capture measurements, and so on. The specific I/O components 1518 that are included in a particular machine 1500 will depend on the type of machine. For example, portable machines such as mobile phones will likely include a touch input device or other such input mechanisms, while a headless server machine will likely not include such a touch input device. It will be appreciated that the I/O components 1518 may include many other components that are not shown in FIG. 15. The I/O components 1518 are grouped according to functionality merely for simplifying the following discussion and the grouping is in no way limiting. In various example embodiments, the I/O components 1518 may include output components 1526 and input components 1528. The output components 1526 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1528 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1518 may include biometric components 1530, motion components 1534, environmental components 1536, or position components 1538 among a wide array of other components. For example, the biometric components 1530 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1534 may include acceleration sensor components (e.g., accelerometer), gravitation sensor components, rotation sensor components (e.g., gyroscope), and so forth. The environment components 1536 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1538 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1518 may include communication components 1540 operable to couple the machine 1500 to a network 1532 or devices 1520 via coupling 1524 and coupling 1522, respectively. For example, the communication components 1540 may include a network interface component or other suitable device to interface with the network 1532. In further examples, communication components 1540 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1520 may be another machine or any of a wide variety of peripheral devices (e.g., a peripheral device coupled via a USB).

Moreover, the communication components 1540 may detect identifiers or include components operable to detect identifiers. For example, the communication components 1540 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1540, such as, location via Internet Protocol (IP) geo-location, location via Wi-Fi® signal triangulation, location via detecting a NFC beacon signal that may indicate a particular location, and so forth.

GLOSSARY

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smart phone, tablet, ultra book, netbook, laptop, multi-processor system, microprocessor-based or programmable consumer electronics, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
   receiving a two-dimensional (2D) image comprising one or more 2D objects;
   generating a three-dimensional (3D) mesh based on the one or more 2D objects;
   generating a material map that maps a 2D texture of the one or more 2D objects to positions of the 3D mesh, wherein the material map includes a plurality of regions each associated with a different portion of the 3D mesh;
   selecting a first texture for a first region of the plurality of regions based on determining that a first portion of the one or more 2D objects comprises an image, the first texture comprising a first geometric shape;
   selecting a second texture for a second region of the plurality of regions based on determining that a second portion of the one or more 2D objects comprises text, the second texture comprising a second geometric shape; and applying the material map to the 3D mesh to output a 3D object representing the 2D object; and wherein the first geometric shape comprises a first set of lines in a first diagonal direction or a first set of hashmarks with a first density, and wherein the second geometric shape comprises a second set of lines in a second diagonal direction opposite to the first diagonal direction or a second set of hashmarks with a second density different form the first density.

2. The method of claim 1, further comprising:
determining an altitude of a client device on which the 3D object is presented; and
modifying one or more visual attributes of the 3D object based on the altitude of the client device, a texture of the 3D object being modified to represent a body of water when the altitude of the client device is a second altitude lower than a first altitude and a geographical location of the client device is associated with a location at which the body of water is present.

3. The method of claim 1, further comprising:
detecting a reference surface in a 3D space captured within a camera feed; and
orienting the 3D object at a position in the 3D space based on the detected reference surface.

4. The method of claim 1, further comprising:
rotating the one or more 2D objects in a 3D space;
extending each point of the one or more 2D objects by a specified amount from a first position to a second position in the 3D space to add depth to the one or more 2D objects;
replicating a color of a first pixel at a first point of the one or more 2D objects in 3D space towards the second position to form a first array of pixels, each pixel in the first array of pixels having an identical color as the color of the pixel at the first point; and
replicating a color of a second pixel at a second point of the one or more 2D objects in 3D space towards the second position to form a second array of pixels, each pixel in the second array of pixels having an identical color as the color of the pixel at the second point, the second array of pixels comprising a different amount of pixels than the first array of pixels.

5. The method of claim 1, wherein portions of first and second arrays of pixels become visible in different amounts as the 3D object is rotated, further comprising:
processing segments of the one or more 2D objects into a polygon edge of the generated 3D mesh.

6. The method of claim 1, wherein the plurality of regions of the material map includes a front region, a back region, an outside region, and an inside region; and wherein applying the material map to the 3D mesh comprises:
applying the first texture from the front region to a front portion of the 3D mesh;
applying a second texture from the inside region to an inside portion of the 3D mesh;
applying a third texture from the outside region to an outside portion of the 3D mesh; and
applying a fourth texture from the back region to a back portion of the 3D mesh.

7. The method of claim 6, further comprising generating the fourth texture from the back region by mirroring the first texture in the front region vertically.

8. The method of claim 6, wherein the first, second, third, and fourth textures are applied by overlaying the first, second, third and fourth textures over portions of the 3D mesh corresponding to the positions.

9. The method of claim 6, further comprising:
generating, for display, the 3D object in an image captured by a client device;
receiving input manipulating the 3D object in 3D space; and
modifying amounts of the first, second, third, and fourth textures that are presented as part of the 3D object based on the received input.

10. The method of claim 1, wherein the 3D object is modified to illustrate a sky when an first altitude of a client device is associated with flying.

11. The method of claim 1, wherein the 3D object is generated with brighter color textures at a first point in time in a day, wherein the 3D object is generated with darker color textures at a second point in time in the day.

12. The method of claim 1, further comprising:
determining that computational power of a client device exceeds a threshold, wherein the 3D mesh is generated in response to determining that the computational power of the client device exceeds the threshold.

13. The method of claim 1, further comprising:
determining that computational power of a client device fails to exceed a threshold; and
in response to determining that the computational power of the client device fails to exceed the threshold:
generating a plurality of duplicates of the 2D image;
stacking the plurality of duplicates behind each other in a 3D space that are offset from each other by a specified number of pixels in the 3D space to output the 3D object; and
inserting a plurality of spaces between each adjacent pair of the plurality of duplicates, such that a space is inserted between first and second adjacent duplicates of the plurality of duplicates, each of the plurality of spaces comprising a number of grey pixels corresponding to the specified number of pixels.

14. The method of claim 13, further comprising:
receiving input to rotate the 3D object in the 3D space; and
automatically modifying an amount of the plurality of duplicates and the amount of the plurality of spaces that are presented on the client device as the 3D object is rotated about its axis.

15. The method of claim 1, further comprising:
selecting a predetermined pattern associated with the one or more 2D objects; and
generating the first texture and the second texture associated with the second region of the plurality of regions based on the predetermined pattern.

16. A system comprising:
one or more processors configured to perform operations comprising:
receiving a two-dimensional (2D) image comprising one or more 2D objects;
generating a three-dimensional (3D) mesh based on the one or more 2D objects;
generating a material map that maps a 2D texture of the one or more 2D objects to positions of the 3D mesh, wherein the material map includes a plurality of regions each associated with a different portion of the 3D mesh;
selecting a first texture for a first region of the plurality of regions based on determining that a first portion of the one or more 2D objects comprises an image, the first texture comprising a first geometric shape;
selecting a second texture for a second region of the plurality of regions based on determining that a second portion of the one or more 2D objects comprises text, the second texture comprising a second geometric shape; and applying the material map to the 3D mesh to output a 3D object representing the 2D object; and wherein the first geometric shape comprises a first set of lines in a first diagonal direction or a first set of hashmarks with a first density, and wherein the second geometric shape comprises a second set of lines in a second diagonal direction opposite to the first diagonal direction or a second set of hashmarks with a second density different form the first density.

17. The system of claim 16, wherein the 3D object is modified to illustrate a sky when an first altitude of a client device is associated with flying.

18. A non-transitory machine-readable medium storing non-transitory instructions which, when executed by one or more processors of a machine, cause the machine to perform operations comprising:

receiving a two-dimensional (2D) image comprising one or more 2D objects;

generating a three-dimensional (3D) mesh based on the one or more 2D objects;

generating a material map that maps a 2D texture of the one or more 2D objects to positions of the 3D mesh, wherein the material map includes a plurality of regions each associated with a different portion of the 3D mesh;

selecting a first texture for a first region of the plurality of regions based on determining that a first portion of the one or more 2D objects comprises an image, the first texture comprising a first geometric shape;

selecting a second texture for a second region of the plurality of regions based on determining that a second portion of the one or more 2D objects comprises text, the second texture comprising a second geometric shape; and applying the material map to the 3D mesh to output a 3D object representing the 2D object; and wherein the first geometric shape comprises a first set of lines in a first diagonal direction or a first set of hashmarks with a first density, and wherein the second geometric shape comprises a second set of lines in a second diagonal direction opposite to the first diagonal direction or a second set of hashmarks with a second density different form the first density.

19. The non-transitory machine-readable medium of claim 18, wherein the 3D object is modified to illustrate a sky when an first altitude of a client device is associated with flying.

* * * * *